US008400528B2

(12) United States Patent
Ochi et al.

(10) Patent No.: US 8,400,528 B2
(45) Date of Patent: Mar. 19, 2013

(54) IMAGING DEVICE

(75) Inventors: Atsuo Ochi, Tokyo (JP); Takayuki Hayashi, Kyoto (JP); Hiroya Kusaka, Hyogo (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 12/370,027

(22) Filed: Feb. 12, 2009

(65) Prior Publication Data

US 2009/0207279 A1 Aug. 20, 2009

Related U.S. Application Data

(63) Continuation of application No. PCT/JP2008/050296, filed on Jan. 11, 2008.

(30) Foreign Application Priority Data

Jan. 15, 2007 (JP) ................................. 2007-005611

(51) Int. Cl.
*H04N 5/76* (2006.01)

(52) U.S. Cl. .................................. 348/231.99

(58) Field of Classification Search ............. 348/231.99, 348/231.2, 231.3, 231.5, 208.13, 208.4
See application file for complete search history.

(56) References Cited

U.S. PATENT DOCUMENTS

| 5,724,579 | A  | * | 3/1998  | Suzuki ................................. 1/1 |
| 6,813,394 | B1 | * | 11/2004 | Matsumoto et al. .......... 382/305 |
| 6,930,718 | B2 | * | 8/2005  | Parulski et al. .......... 348/333.11 |
| 7,826,092 | B2 | * | 11/2010 | Ejima et al. ..................... 358/2.1 |
| 8,212,897 | B2 | * | 7/2012  | Steinberg et al. ............. 348/239 |
| 2001/0028394 | A1 | * | 10/2001 | Matsumoto et al. .......... 348/207 |
| 2003/0026607 | A1 |   | 2/2003  | Okisu et al. |
| 2003/0193610 | A1 | * | 10/2003 | Nozaki et al. ................. 348/345 |
| 2004/0239777 | A1 |   | 12/2004 | Nakamura et al. |
| 2004/0258304 | A1 |   | 12/2004 | Shiota et al. |
| 2005/0243187 | A1 | * | 11/2005 | Watanabe et al. .......... 348/231.2 |
| 2005/0264678 | A1 |   | 12/2005 | Butterworth |
| 2006/0256396 | A1 |   | 11/2006 | Ejima et al. |
| 2007/0216950 | A1 | * | 9/2007  | Yamakado et al. .......... 358/1.18 |
| 2008/0129837 | A1 | * | 6/2008  | Masumoto et al. ........ 348/231.2 |
| 2008/0316327 | A1 | * | 12/2008 | Steinberg et al. .......... 348/222.1 |
| 2008/0316328 | A1 | * | 12/2008 | Steinberg et al. .......... 348/222.1 |
| 2009/0148069 | A1 | * | 6/2009  | Inoha et al. ..................... 382/305 |
| 2009/0153701 | A1 | * | 6/2009  | Koutaki et al. ............. 348/231.2 |
| 2009/0167873 | A1 | * | 7/2009  | Sakaue et al. ............... 348/207.2 |
| 2009/0172011 | A1 | * | 7/2009  | Onomura ....................... 707/102 |
| 2012/0069198 | A1 | * | 3/2012  | Steinberg et al. .......... 348/207.1 |
| 2012/0069222 | A1 | * | 3/2012  | Steinberg et al. ............. 348/239 |

FOREIGN PATENT DOCUMENTS

| JP | 01-201776 A  | 8/1989  |
| JP | 03-036886 A  | 2/1991  |
| JP | 04-317284 A  | 11/1992 |
| JP | 06-325147 A  | 11/1994 |
| JP | 07-245723 A  | 9/1995  |
| JP | 10-257370 A  | 9/1998  |
| JP | 11-341421 A  | 12/1999 |
| JP | 2000-076276 A | 3/2000  |

(Continued)

*Primary Examiner* — Aung S Moe

(74) *Attorney, Agent, or Firm* — Pearne & Gordon LLP

(57) ABSTRACT

Provided is an imaging device capable of accurately and rapidly selecting a main image from a plurality of continuously captured images and simplifying handling of image files recorded on a memory card. With one operation, it is possible to capture a plurality of continuous images at a predetermined time interval. A main image is selected from the captured images and the image data on the main image and the image data on sub images other than the main image are recorded as one image file on a recording medium (220).

10 Claims, 20 Drawing Sheets

FOREIGN PATENT DOCUMENTS

| | | |
|---|---|---|
| JP | 2000-350123 A | 12/2000 |
| JP | 2002-051250 A | 2/2002 |
| JP | 2002-191014 A | 7/2002 |
| JP | 2004-120576 A | 4/2004 |
| JP | 2004-180076 A | 6/2004 |
| JP | 2006-197243 A | 7/2004 |
| JP | 2004-229073 A | 8/2004 |
| JP | 2004-236120 A | 8/2004 |
| JP | 2005-049968 A | 2/2005 |
| JP | 2005-143020 A | 6/2005 |
| JP | 2005-227957 A | 8/2005 |
| JP | 2006-295244 A | 10/2006 |
| JP | 2006-311060 A | 11/2006 |
| JP | 2006-324920 A | 11/2006 |

* cited by examiner

| ABCD0002(1) | ABCD0002(2) | ABCD0002(3) |
|---|---|---|
| ABCD0002(4) | ABCD0002(5) | ABCD0002(6) |
| ABCD0002(7) | | |

FIG.11

IMAGING DEVICE

TECHNICAL FIELD

The present invention relates to an imaging apparatus such as a digital camera, and more particularly to an imaging apparatus capable of continuously capturing a plurality of images at a predetermined time interval.

BACKGROUND ART

In recent years, remarkable progress has been made in the field of camera-related technology, and digital cameras have come to replace conventional film cameras.

An advantage of a digital camera is that, whereas a conventional film camera does not allow a captured image to be checked before being developed, a digital camera allows a captured image to be checked on the spot, resulting in few failures even by a beginner. Also, while film can only be used once, a digital camera records captured images in removable semiconductor memory (hereinafter referred to as a "memory card"), which can be used any number of times if recorded images are deleted, and is thus advantageous from a cost standpoint. Furthermore, since captured images are digital signals, the amount of recorded data can be reduced by using image compression technology, enabling still more efficient use of a memory card.

A photographer who is unused to photography may miss a shutter release opportunity by operating the shutter at a moment when the subject has his/her eyes closed or his/her head turned to one side, for instance, or may take a blurred picture due to unsteady handling of the camera ("shake") when shooting. In addition, many have had the experience of taking a fuzzy or overexposed photograph because of an inappropriate shooting condition setting.

Some cameras are equipped with a continuous shooting function in order to solve such problems. Use of this continuous shooting function makes it possible to take multiple photographs of the same subject continuously under the same shooting conditions, and enables the best of the captured images to be selected. Moreover, a so-called "auto-bracket" function is becoming popular that makes it possible to perform continuous shooting while varying shooting conditions such as exposure and white balance on an image-by-image basis.

With the above-described continuous shooting function, a plurality of images are recorded in a memory card in one shooting. These images are recorded as one image file for one image. Each image included in images captured by this continuous shooting function (hereinafter referred to as "continuous-shot images") differs in nature from an image captured by a normal shooting function (hereinafter referred to as a "single-shot image") A single-shot image is a single independent image, and the shooting time, shooting location, shooting conditions, and so forth, differ for each such image. In contrast, a continuous-shot image is one of a series of images, and after being captured, these images are handled together.

Therefore, if continuous-shot images are recorded in the same way as single-shot images, inconvenience arises in the handling of continuous-shot images. For example, it is laborious to select and print one image from among continuous-shot images (because it is the most successfully captured, or particularly pleasing, or for some other reason), or to input that one image to a personal computer (hereinafter referred to as a "PC") and subject it to various kinds of processing. Also, it is necessary to select all images each time continuous-shot images are deleted, moved, or copied together, making the operating procedure cumbersome. Furthermore, the photographer must judge all continuous-shot images visually in order to find one image among the continuous-shot images, which is time-consuming and may lead to an incorrect selection.

In order to resolve such problems, a method has been proposed whereby, by creating a new folder in a memory card each time continuous shooting is performed, and recording a plurality of image files obtained by one continuous shooting within that folder, continuous-shot image retrieval, playback, printing, deletion, and suchlike processing is performed easily even if many image files are generated by one continuous shooting operation (see Patent Document 1, for example).

Also, a method has been proposed whereby continuous-shot images are recorded in a memory card with a continuous shooting ID added to the header of each image file, and a continuous-shot image file can be retrieved rapidly even if a single-shot image file is recorded in the same folder as a continuous-shot image file (see Patent Document 2, for example).

Additionally, a method has been proposed whereby continuous-shot images captured by means of an auto-bracket function are displayed simultaneously in a display section, simplifying selection of a desired image (see Patent Document 3, for example).

Patent Document 1: Japanese Patent Application Laid-Open No. HEI 11-341421
Patent Document 2: Japanese Patent Application Laid-Open No. 2005-143020
Patent Document 3: Japanese Patent Application Laid-Open No. 2004-229073
Patent Document 4: Japanese Patent Application Laid-Open No. HEI 7-245723
Patent Document 5: Japanese Patent Application Laid-Open No. HEI 6-325147
Patent Document 6: Japanese Patent Application Laid-Open No. HEI 1-201776

DISCLOSURE OF INVENTION

Problems to be Solved by the Invention

However, with the conventional technology disclosed in Patent Document 1, continuous-shot images are recorded together in the same folder, and therefore, although deletion and so forth requires only one operation, these images cannot be viewed in comparison with other continuous-shot images or single-shot images stored in another folder. Also, if single-shot images and continuous-shot images are stored in the same folder, there is no differentiation between continuous-shot images and single-shot images.

With the conventional technology disclosed in Patent Document 2, continuous-shot images and single-shot images can be held in the same folder, but the number of image files becomes huge, and retrieving a necessary image file takes time. Also, images captured by the same continuous shooting operation may be stored in a different folder midway through an operation, making image file organization difficult.

With the conventional technology disclosed in Patent Document 3, images captured and stored by means of an auto-bracket function are displayed on a screen simultaneously, simplifying selection, but since the screen is small, a minor difference between images is difficult for a photographer to judge.

Thus, heretofore, even though many images are captured by continuous shooting, image file organization has been cumbersome and retrieval and processing of a desired image file has been laborious. Henceforth, the continuous shooting function is expected to become a more important function than heretofore as memory card capacities continue to increase, making resolution of the above problems a major concern.

It is an object of the present invention to provide an imaging apparatus that enables a plurality of related images obtained by continuous shooting to be handled easily.

It is a further object of the present invention to provide an imaging apparatus that accurately and rapidly selects a main image from a plurality of continuous-shot images obtained by continuous shooting, and simplifies handling of image files recorded in a memory card.

Means for Solving the Problems

An imaging apparatus of the present invention employs a configuration having an imaging section that continuously captures a plurality of images and acquires a plurality of image data, and a control section that selects one item of image data from the plurality of image data and records the selected image data and remaining image data as one image file. By this means, a plurality of related images obtained by continuous shooting can be handled easily.

An imaging apparatus of the present invention employs a configuration having a continuous shooting section that captures a continuous plurality of images at a predetermined time interval in one operation, a recording section that records image data corresponding to the captured plurality of captured images in a recording medium, and a main image selection section that selects one main image from the plurality of captured images, wherein the recording section records image data of the main image and image data of a sub-image other than the main image as one image file. By this means, a plurality of continuous-shot images obtained by continuous shooting can be handled as one image file in a memory card, and a main image representing a continuous-shot image can be retrieved easily.

With an imaging apparatus of the present invention, provision may also be made for the continuous shooting section further to have a continuous shooting condition setting section that sets continuous shooting conditions including the time interval and the number of images captured at one time at a time of shooting according to an operation of a photographer. By this means, a photographer can set continuous shooting conditions freely, and the degree of freedom of shooting further increases.

Provision may also be made for an imaging apparatus of the present invention further to have a shooting state detection section that detects shooting states of the plurality of captured images at a time of shooting, and for the main image selection section to select the main image based on a detection result of the shooting state detection section. By this means, a main image can be selected accurately and rapidly from a plurality of continuous-shot images.

With an imaging apparatus of the present invention, provision may also be made for the shooting state detection section to detect an amount of shake at a time of shooting, and for the main image selection section to select a captured image for which the detected amount of shake is smallest as the main image.

With an imaging apparatus of the present invention, provision may also be made for the shooting state detection section to detect an amount of motion of a subject at a time of shooting, and for the main image selection section to select a captured image for which the detected amount of motion of the subject is smallest as the main image.

With an imaging apparatus of the present invention, provision may also be made for the shooting state detection section to detect a degree of focusing on a subject at a time of shooting, and for the main image selection section to select a captured image for which the detected degree of focusing is highest as the main image.

With an imaging apparatus of the present invention, provision may also be made for the shooting state detection section to detect whether or not a subject has his/her eyes closed by recognizing a face of a subject at a time of shooting, and for the main image selection section to inhibit selection of a captured image in which the eyes are closed as the main image.

Provision may also be made for an imaging apparatus of the present invention further to have a first and second shooting operation section that starts shooting at a predetermined time interval by means of a first shooting operation and terminates shooting after capturing a predetermined number of images at a predetermined time interval by means of a second shooting operation, and for the shooting state detection section to detect the second shooting operation, and for the main image selection section to select a captured image captured first after the second shooting operation as the main image. By this means, an image captured at shutter release opportunity timing can be selected as a main image.

Provision may also be made for an imaging apparatus of the present invention further to have a shooting condition changing section that changes shooting conditions for each of the plurality of captured images, and a display section that displays the plurality of captured images, and for the main image selection section to select the main image from among the plurality of captured images displayed in the display section according to an operation of a photographer. By this means, an image most liked by a photographer can be selected as a main image.

With an imaging apparatus of the present invention, provision may also be made for the shooting condition changing section further to have a shooting condition setting section that sets change contents of the shooting conditions at a time of shooting according to an operation of a photographer. By this means, a photographer can set shooting condition change contents freely, and the degree of freedom of shooting further increases.

Provision may also be made for an imaging apparatus of the present invention further to have an image file processing section that selects the image file recorded in the recording medium and executes predetermined processing thereon, and for the image file processing section to have the main image only as a processing object. By this means, display, printing, copying, movement, transmission, and suchlike processing of a main image only is simplified. Also, in copying, transmission, and the like, the recording capacity can be reduced, and high-speed processing becomes possible.

With an imaging apparatus of the present invention, provision may also be made for the image file processing section to have the main image and the sub-image as processing objects. By this means, display, copying, deletion, and suchlike processing of all captured images captured by continuous shooting can be executed by means of one file operation.

With an imaging apparatus of the present invention, provision may also be made for the recording section to store a detection result of the shooting state detection section together with the image data in the image file and record these in the recording medium. By this means, a shooting state detection result can be utilized in main image selection even after a continuous-shot image file has been recorded in a recording medium.

Provision may also be made for an imaging apparatus of the present invention further to have a main image replacement section that replaces the main image of the image file with an arbitrary sub-image. By this means, a main image of an image file can easily be replaced with a preferred sub-image even after recording in a recording medium.

With an imaging apparatus of the present invention, provision may also be made for the main image replacement section to have a diet mode that deletes all the sub-images and creates a new image file of the main image only. By this means, recording capacity can be utilized efficiently by deleting unnecessary sub-images by means of a single operation when the recording medium capacity becomes insufficient, for instance.

Advantageous Effect of the Invention

According to an imaging apparatus of the present invention, a plurality of related images obtained by continuous shooting can be handled easily. In addition, an imaging apparatus can be provided that accurately and rapidly selects a main image from a plurality of continuous-shot images obtained by continuous shooting, and simplifies handling of image files recorded in a memory card.

BRIEF DESCRIPTION OF DRAWINGS

FIG. 11 is a drawing showing a sample multi-display mode screen according to Embodiment 1 of the present invention;

BEST MODE FOR CARRYING OUT THE INVENTION

Embodiments of the present invention will now be described with reference to the accompanying drawings.

(Embodiment 1)

Figure 1:
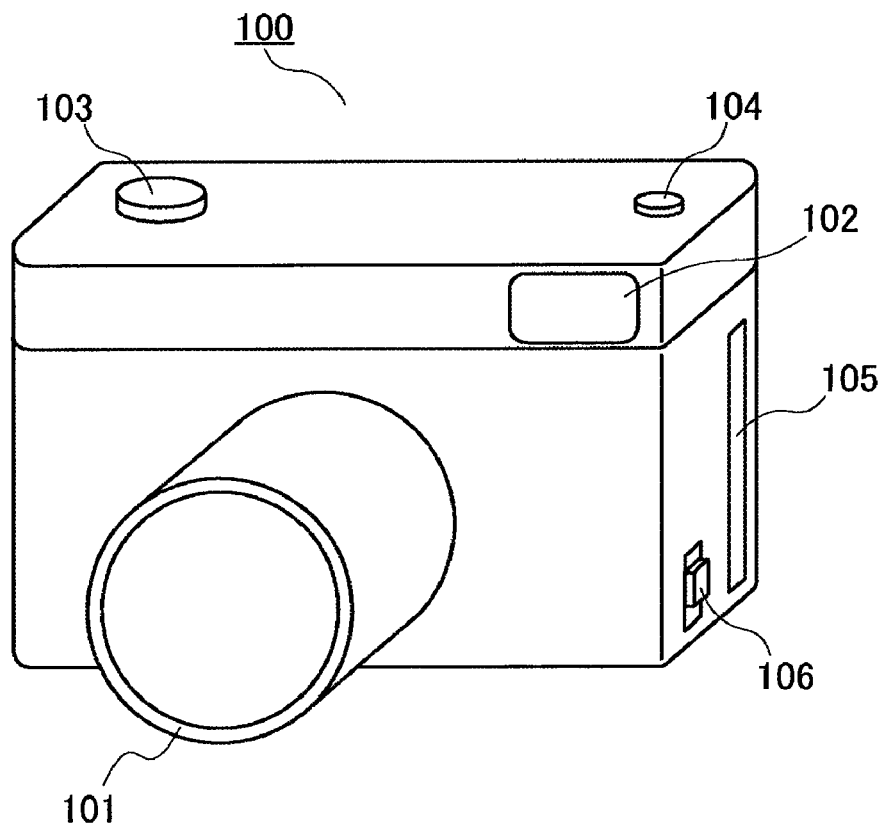
FIG. 1 is an outline drawing of a digital camera equipped with a continuous shooting function according to Embodiment 1 of the present invention.

FIG. 1 is an outline drawing of digital camera 100 equipped with a continuous shooting function according to Embodiment 1 of the present invention. Digital camera 100 has lens barrel 101, viewfinder 102, release button 103, normal shooting/continuous shooting switching button 104, memory card insertion slot 105, and memory card eject button 106. Normally, after the composition of a subject has been checked through viewfinder 102, one image is captured each time release button 103 is pressed, and a captured image is recorded in a flash memory or suchlike memory card (not shown) inserted via memory card insertion slot 105. After shooting, the memory card is removed from the body of the camera by pressing memory card eject button 106, and an image is played back by being input to a PC or the like, or is enjoyed after editing or processing.

The method of performing continuous shooting with digital camera 100 will now be described.

First, normal shooting/continuous shooting switching button 104 is pressed to switch to continuous shooting mode. Then a subject for which continuous shooting is to be performed is checked through viewfinder 102, and release button 103 is pressed down lightly to about the midpoint of its full stroke. At this point continuous shooting starts, and release button 103 is pressed down deeply almost as far as the full-stroke position precisely at shutter release opportunity timing. At this timing a shutter release opportunity captured image is captured, after which shooting is terminated following the successive capture of a preset number of images. These continuously captured images are temporarily stored in buffer memory in the digital camera, and then undergo predetermined processing and are saved in the memory card.

Continuous shooting will now be described in detail with reference to FIG. 2.

Figure 2:
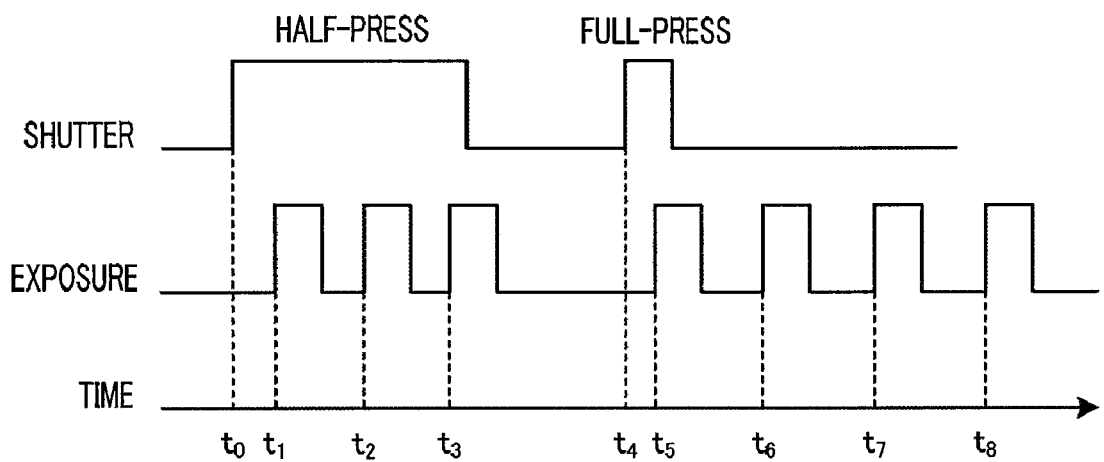
FIG. 2 is a drawing showing the relationship between a release button and exposure at the time of a continuous shooting operation according to Embodiment 1 of the present invention.

FIG. 2 is a drawing showing the relationship between release button 103 and exposure at the time of a continuous shooting operation according to Embodiment 1 of the present invention. In FIG. 2, assuming that release button 103 is half-pressed at time $t_0$, the first exposure starts at time $t_1$. Thereafter, while the half-press state continues, shooting is performed periodically with exposures being repeated at times $t_2$ and $t_3$ based on a preset time interval. Then, when release button 103 is full-pressed at time $t_4$, exposure is performed at immediately following time $t_5$, and the subject is imaged at the timing at which the photographer most wants to perform shooting. Following this, shooting ends after a preset number of images have been captured at a preset time interval. FIG. 2 shows a case in which three more images are captured after release button 103 has been full-pressed and one shutter release opportunity image has been captured at time $t_5$, with shooting continuing to be performed at times $t_6$, $t_7$, and $t_8$.

The continuous shooting time interval and the number of images captured after release button 103 is full-pressed can be set separately via a menu displayed on a liquid crystal display (LCD) or the like described later herein provided on the rear of the body of the digital camera. In the above description, an example has been shown in which the photographer consciously controls a shutter release opportunity by combining half-press and full-press of release button 103, but the present invention is not limited to this, and continuous shooting may also be executed by using a normal continuous shooting mode in which continuous shooting is performed at a preset shooting time interval while the photographer is half-pressing release button 103, or a self-timer function. Also, a configuration may also be used whereby the number of continuously captured images and shooting time interval are set in advance in the body of the camera, and can be changed by the photographer. Furthermore, the shooting time interval need not be fixed.

Figure 3:
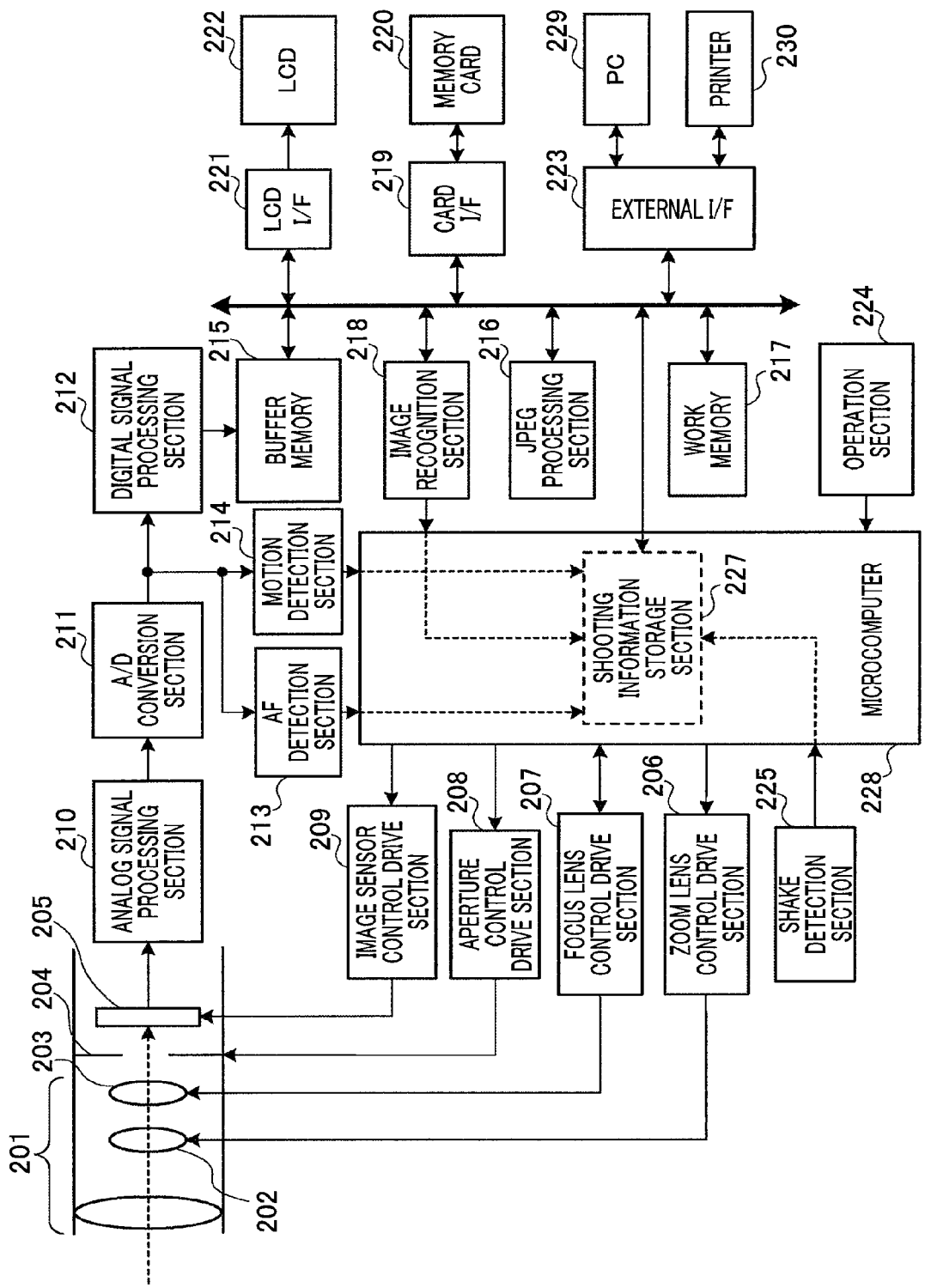
FIG. 3 is a block diagram showing an example of the circuit configuration of a digital camera according to Embodiment 1 of the present invention.

FIG. 3 is a block diagram showing an example of the circuit configuration of digital camera 100 according to Embodiment 1 of the present invention. In FIG. 3, digital camera 100 has imaging lens group 201 that includes zoom lens 202 and focus lens 203, aperture 204, image sensor 205, zoom lens control drive section 206, focus lens control drive section 207, aperture control drive section 208, image sensor control drive section 209, analog signal processing section 210, analog/digital (AM/D) conversion section 211, digital signal processing section 212, auto focus (AF) detection section 213, motion detection section 214, buffer memory 215, JPEG processing section 216, work memory 217, image recognition section 218, card interface (I/F) 219, memory card 220, LCD interface (I/F) 221, LCD 222, external interface (I/F) 223, operation section 224, shake detection section 225, data bus 226, and microcomputer 228 incorporating shooting information storage section 227. It is possible to connect PC 229, printer 230, and so forth, to external I/F 223.

Imaging lens group 201 is an optical system for forming an image of a subject on image sensor 205. Zoom lens 202 is a lens for providing an optically enlarged image of a subject, and is moved along the optical axis in line with telephoto and wide-angle shooting by zoom lens control drive section 206. Focus lens 203 is a lens for adjusting the focal point of a subject, and is moved along the optical axis by focus lens control drive section 207 so that the focal point is on image sensor 205.

Aperture 204 is a mechanism for adjusting the optimal exposure amount based on ambient brightness, the size of its opening being controlled by aperture control drive section 208. Image sensor 205 is an element comprising a CCD or the like that performs photoelectric conversion of a subject imaged by imaging lens group 201 to produce an electrical signal, and is controlled by image sensor control drive section 209. Analog signal processing section 210 executes predetermined analog signal processing such as gain adjustment and gamma processing on an analog image signal output from image sensor 205. A/D conversion section 211 converts an analog image signal output from analog signal processing section 210 to a digital image signal.

Digital signal processing section 212 executes digital processing such as noise removal and edge enhancement on image data. AF detection section 213 calculates an image data contrast value and detects a degree of focusing. The detection result is input to microcomputer 228, and used for focus lens 203 control driving. Motion detection section 214 detects an amount of motion of a subject at the time of shooting from a digital image data motion vector or the like, and outputs the detection result to microcomputer 228. Shake detection section 225 comprises an angular speed sensor or the like, and detects an amount of shake at the time of shooting. Then this detection result is input to microcomputer 228 and used for shake correction. Here, "shake" means vibration of digital camera 100 due to movement of the hands of a photographer holding digital camera 100 or the like.

Buffer memory 215 comprises SDRAM or the like having a capacity that allows a plurality of uncompressed images to be stored. Image data is temporarily stored in this buffer memory 215 via digital signal processing section 212. Image recognition section 218 is a processing circuit for recognizing a face part from image data read from buffer memory 215, and detecting a failed image in which the subject's eyes are closed or the like. A face recognition result is input to microcomputer 228. JPEG processing section 216 is a processing circuit for generating compressed data at the time of recording by executing JPEG compression processing on image data stored in buffer memory 215, and restoring original uncompressed image data at the time of playback by executing JPEG decompression processing on compressed data. Work memory 217 is used to convert JPEG compressed data to a file format for recording in memory card 220. In this work memory 217, an image file for recording is formed by adding a header to compressed data. Here, a header comprises shooting-time shooting information and a minified image (hereinafter referred to as a "thumbnail image") for identifying an image. Memory card 220 is a removable semiconductor memory card, such as flash memory, for example, in which an above-described image file is recorded and saved via card I/F 219.

LCD 222 is a display section comprising a liquid crystal display element, and displays an image via LCD I/F 221. During shooting, a through-image is displayed on LCD 222 in order to check the subject, and after shooting, an image recorded in memory card 220 is displayed on LCD 222 via buffer memory 215 to allow the image to be checked. Operation section 224 is used by the photographer to input a digital camera 100 shooting mode and various kinds of shooting conditions (exposure, zoom, focus, and so forth) Setting information input via this operation section 224 and a menu screen for performing operations are also displayed on LCD 222.

The above-described elements are connected to data bus 226, and image data, JPEG compressed data, control information, and so forth, are exchanged among the elements via this data bus 226. In the above description, buffer memory 215 that stores uncompressed image data and work memory that stores JPEG compressed data have been described as being separate, but these two memories may also use common memory.

Microcomputer 228 performs integrated management of the entirety of digital camera 100, and controls shooting, recording, playback, display, and suchlike operations in accordance with various shooting conditions set by the photographer via the operation section. Microcomputer 228 also performs control of information communication with other external devices such as PC 229 and printer 230 via external I/F 223, and so forth. In addition, per-captured-image shooting states detected by AF detection section 213, motion detection section 214, image recognition section 218, and shake detection section 225 are input to microcomputer 228, and after being stored in shooting information storage section 227 in microcomputer 228, these per-captured-image shooting states are processed into header information, and recorded in memory card 220 embedded in an image file together with compressed data.

Microcomputer 228 has a function of selecting one item of image data from a plurality of image data obtained by continuously capturing a plurality of images by means of a continuous shooting function, and recording selected image data and remaining image data as one image file. Microcomputer 228 reads that image file, receives a selection of one item of image data from a plurality of image data, replaces image data selected the previous time with the image data selected this time, and records the image data selected this time and the remaining image data in the relevant image file. At this time, the image data structure may be a structure whereby the image data selected this time and the remaining image data are transposed in the relevant image file when image data selected the previous time is replaced with the image data selected this time, or may be a structure whereby the image data selected this time is copied to a predetermined location in the relevant image file.

To be more specific, microcomputer 228 has a function of, for example, selecting one item of image data from a plurality of image data obtained by continuously capturing a plurality of images by means of a continuous shooting function, recording the selected main image at the start of one image file, and recording image data of other than the main image as sub-images after the main image of that image file. Also, when main image replacement is performed, microcomputer 228 records a post-replacement main image at the start of that image file, and records image data of other than the main image after the main image of that image file. That is to say, microcomputer 228 reads that image file, receives a selection of one item of image data from a plurality of image data, records the selected image data as a new main image at the start of that image file, and records the remaining image data after the main image of that image file.

In relation to the image file structure, when playing back a plurality of image data, for example, microcomputer 228 first plays back the selected image data (main image), or plays back only the selected image data (main image) and image data preceding and following this. Also, microcomputer 228 reads an image file, receives an image data selection from a plurality of image data, and deletes the selected image data from that image file (selective deletion of image data).

Figure 20:
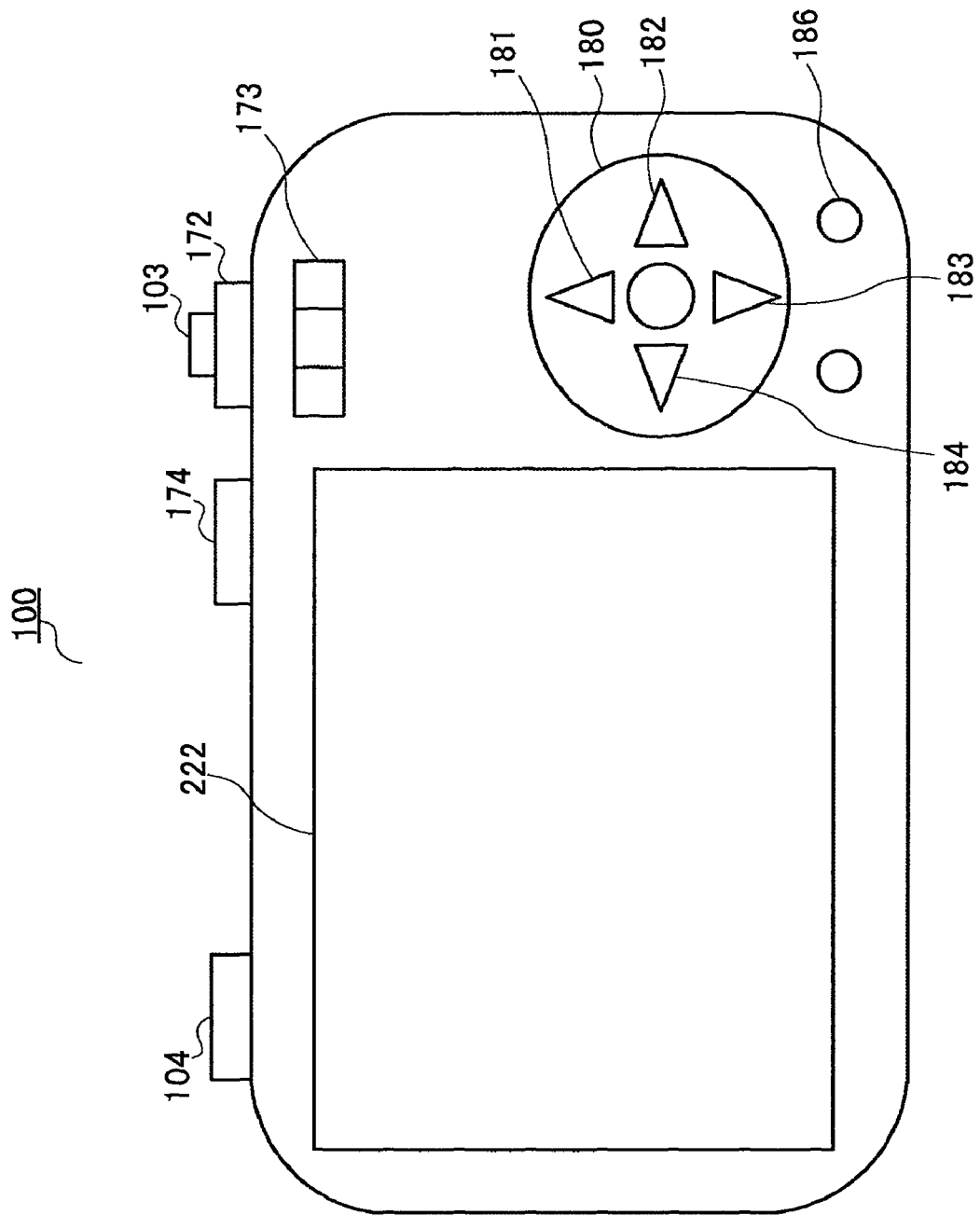
FIG. 20 is a rear view of a digital camera equipped with a continuous shooting function according to Embodiment 1 of the present invention.

FIG. 20 is a rear view of digital camera 100 equipped with a continuous shooting function according to Embodiment 1 of the present invention. FIG. 20 also shows dials that are not shown in FIG. 1 for the sake of simplicity.

Release button 103, normal shooting/continuous shooting switching button 104, zoom dial 172, and mode dial 174 are located on the top of the camera body. Release button 103 is subjected to a depression operation. In response to a half-press operation of release button 103, microcomputer 228 starts auto exposure (AE) control and auto focus (AF) control, and in response to a full-press operation of release button 103, microcomputer 228 performs imaging of a subject. Zoom dial 172 is located so as to be able to turn around release button 103. In response to a zoom dial 172 turning operation, microcomputer 228 starts optical zoom control and electronic zoom control. Mode dial 174 is subjected to a turning operation. Mode dial 174 is provided with calibrations, and a digital camera 100 operating mode is assigned to each calibration. Digital camera 100 operating modes include, for example, playback mode, recording mode, and so forth. In response to a mode dial 174 turning operation, microcomputer 228 controls digital camera 100 according to an operating mode specified by mode dial 174.

Power switch 173, arrow keypad 180, delete button 186, and LCD 222 are located on the rear of the camera body. Power switch 173 is subjected to a sliding operation. In response to a power switch 173 sliding operation, microcomputer 228 switches the power state of digital camera 100. LCD 222 displays image data recorded in memory card 220, a menu screen, or the like, for example, according to an operating mode selected by means of mode dial 174 as described above. Arrow keypad 180 is subjected to depression operations of five buttons: 4-directional buttons 181 through 184, and center button 185. In response to an arrow keypad 180 depression operation, microcomputer 228 performs an LCD 222 display operation such as playback image data switching. In response to a delete button 186 depression operation, microcomputer 228 deletes previously selected image data.

The structure of an image file when N continuous-shot images are recorded in memory card 220 will now be described.

Figure 4:
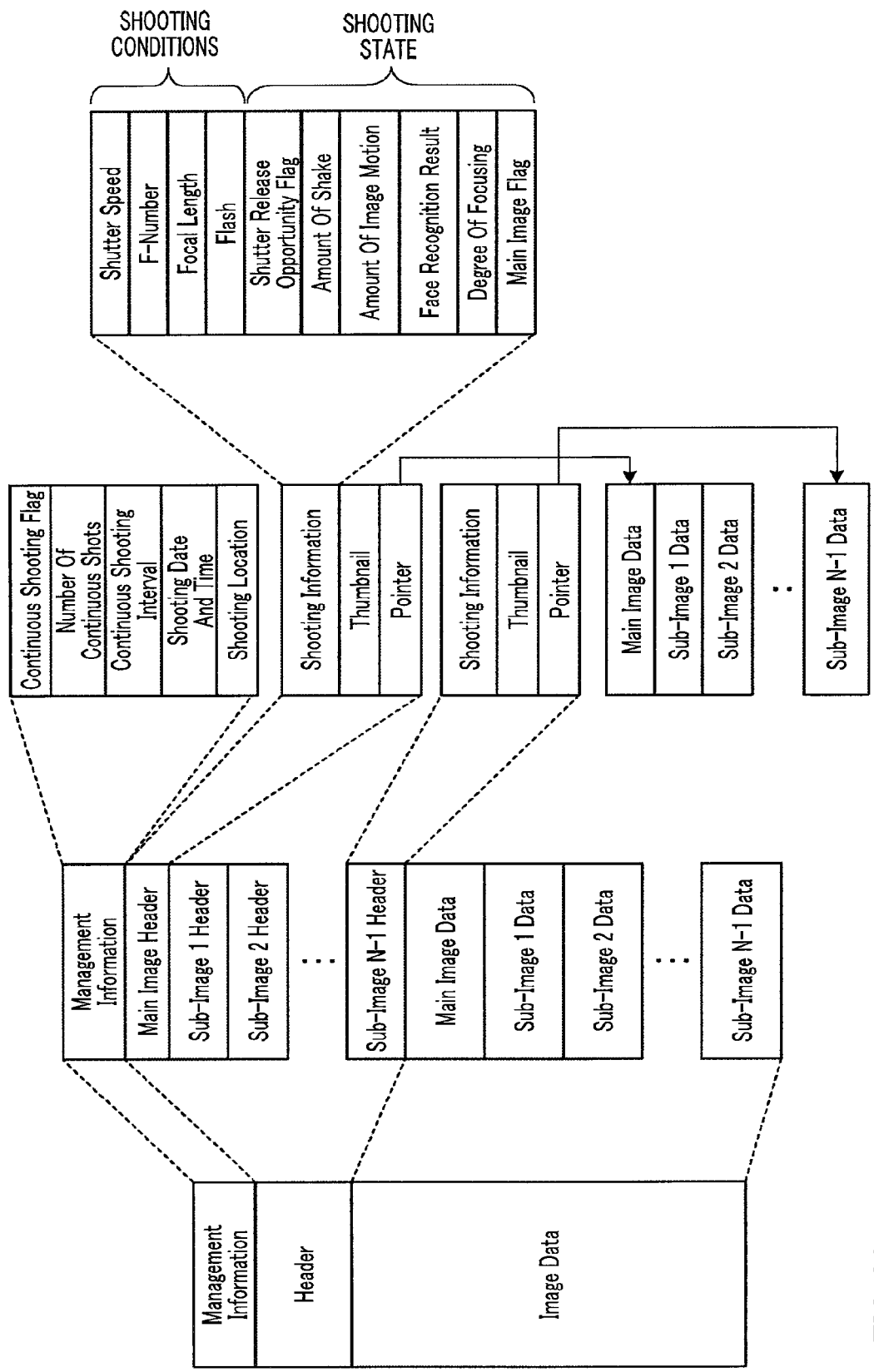
FIG. 4 is drawing showing an example of the structure of a continuous-shot image file according to Embodiment 1 of the present invention.

FIG. 4 is drawing showing an example of the structure of a continuous-shot image file according to Embodiment 1 of the present invention. As shown in FIG. 4A, a continuous-shot image file is composed of three areas: management information, a header, and image data. As shown in FIG. 4B, in the header area and image data area there is stored information on one main-image representing continuous-shot images followed consecutively by N−1 sub-images. That is to say, in this embodiment, a main image is located at the start, and sub-images are located after the main image. Here, main image data and sub-image data are JPEG compressed data. Also, as shown in FIG. 4C, in the management information area there is stored information relating to continuous shooting such as a continuous shooting flag, the number of continuous shots, and the continuous shooting interval, as well as information common to all images such as the shooting date and time and the shooting location, while in the header area there are stored shooting information, a thumbnail image, a pointer, and so forth, that differ for each image. Here, a pointer is information indicating an address at which image data corresponding to a header is stored. Looking at a header enables the storage location of image data in the image file to be ascertained, making it possible for retrieval and suchlike processing to be performed rapidly and easily. As shown in FIG. 4C, in this embodiment a main image header and sub-image header have the same structure.

As shown in FIG. 4D, items stored as shooting information include information indicating the shooting state—such as a shutter release opportunity flag, amount of shake, amount of image motion, a face recognition result (whether or not the eyes are closed), degree of focusing, and a main image flag—in addition to general shooting conditions set prior to shooting such as the shutter speed, f-number, focal length, and use of flash. This shooting state information is used as information for automatically selecting a main image after shooting. However, information stored in a header as shooting information is not limited to this. By using this kind of structure for a continuous-shot image file, N continuous-shot images can be handled as one image file, and differentiation from a single-shot image can be performed easily by means of a continuous shooting flag in the management information. In the structure of a single-shot image file, there is no continuous shooting related management information as in FIG. 4A, and a single-shot image header and image data are recorded in respective header and image data areas.

A method of achieving compatibility between a continuous-shot image file and the Exif (Exchangeable Image File) format currently widely used as a digital camera image file format will now be described.

Figure 5:
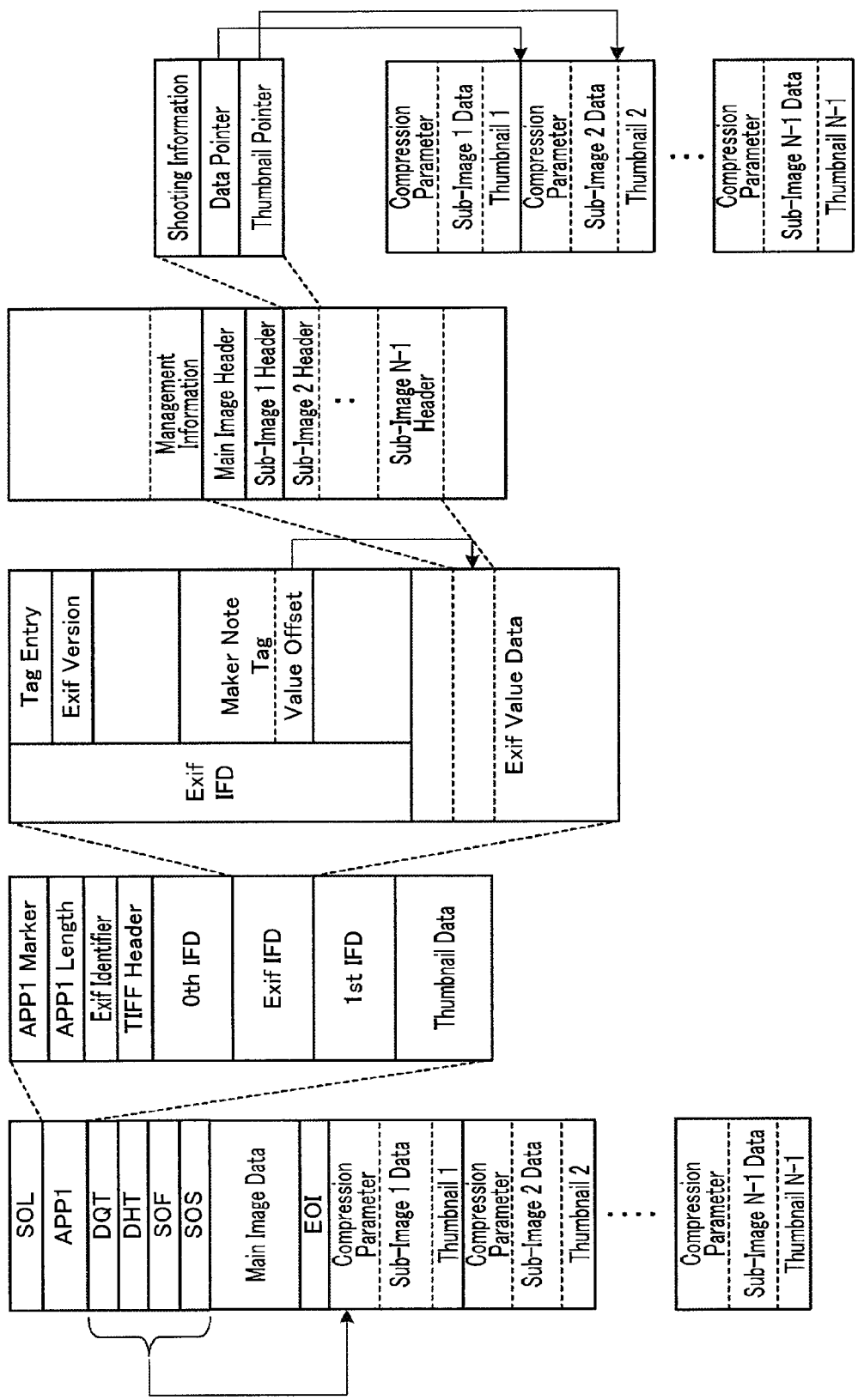
FIG. 5 is an explanatory drawing of a case in which a continuous-shot image file according to Embodiment 1 of the present invention is implemented using an Exif format.

FIG. 5 is an explanatory drawing of a case in which a continuous-shot image file according to Embodiment 1 of the present invention is implemented using the Exif format. As shown in FIG. 5A, continuous-shot image main image data, shooting conditions supported as standard within header information, and so forth, are stored in an Exif format main image area. N−1 sub-images together with associated compression parameters and thumbnail images are added consecutively after a mark (EOI) indicating the end of an image file. As shown in FIG. 5B and FIG. 5C, a tag ("Maker Note Tag") indicating that there is additional information individually defined by a maker is present in "Exif IFD" of an Exif format image file. The actual additional information ("Exif Value Data") is stored from a position indicated by an address ("Value Offset") entered in this tag. Since the structure of this additional information can be decided arbitrarily, the continuous-shot image file management information, main image header, and N−1 sub-image headers are stored as shown in FIG. 5D. In an above sub-image header there are stored, in addition to shooting information, two pointers indicating sub-image data and thumbnail addresses respectively. Using this kind of structure enables continuous-shot images to be handled as one image file while supporting compatibility with the Exif format. That is to say, at least a main image can be played back by an old-format playback apparatus that does not support a new format (image file structure) according to this embodiment.

Figure 6:
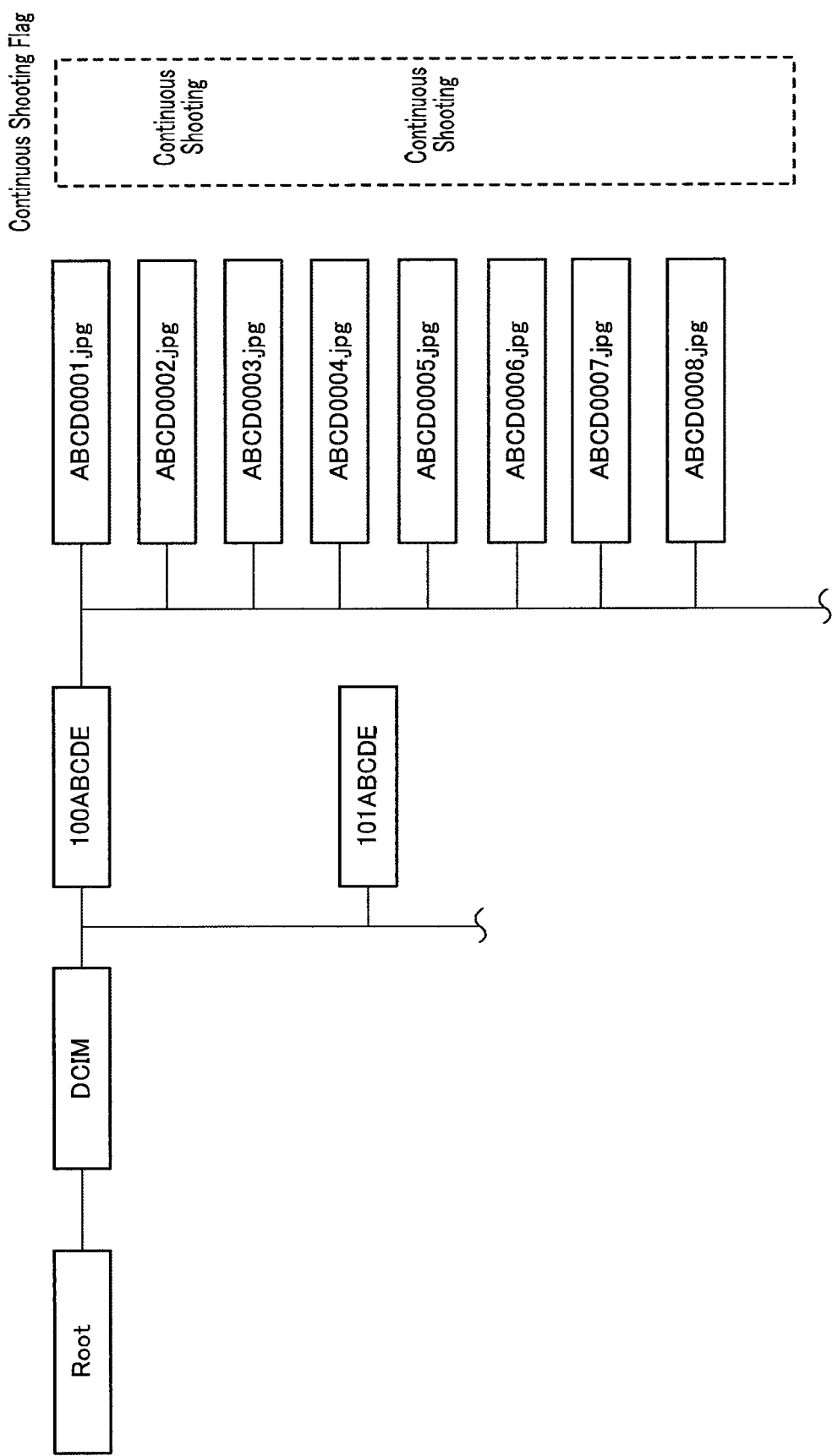
FIG. 6 is a drawing for explaining file management according to Embodiment 1 of the present invention.

FIG. 6 is a drawing for explaining file management according to Embodiment 1 of the present invention, and shows the general directory (folder) structure inside memory card 220 used by digital camera 100. As shown in FIG. 6, there is a DCF image root directory called "DCIM" in the root of memory card 220, and directly below this are DCF directories "100ABCDE", "101ABCDE", and so forth. In DCF directory "100ABCDE" are recorded eight image files ABCD0001.jpg through ABCD0008.jpg, for example. Of these image files, ABCD0002.jpg and ABCD0005.jpg are continuous-shot image files, and the rest are single-shot image files. As shown in FIG. 6, continuous-shot image files are presented to the photographer as one image file in the same way as single-shot image files. Also, even though there are continuous-shot image files and single-shot image files in the same "100ABCDE" directory, they can easily be differentiated by means of a continuous shooting flag identification mark. FIG. 6 shows a view in the case of a digital camera supporting continuous-shot image files, and a continuous shooting flag in the last column is not displayed in the case of a conventional model that does not support continuous-shot image files.

Figure 21:
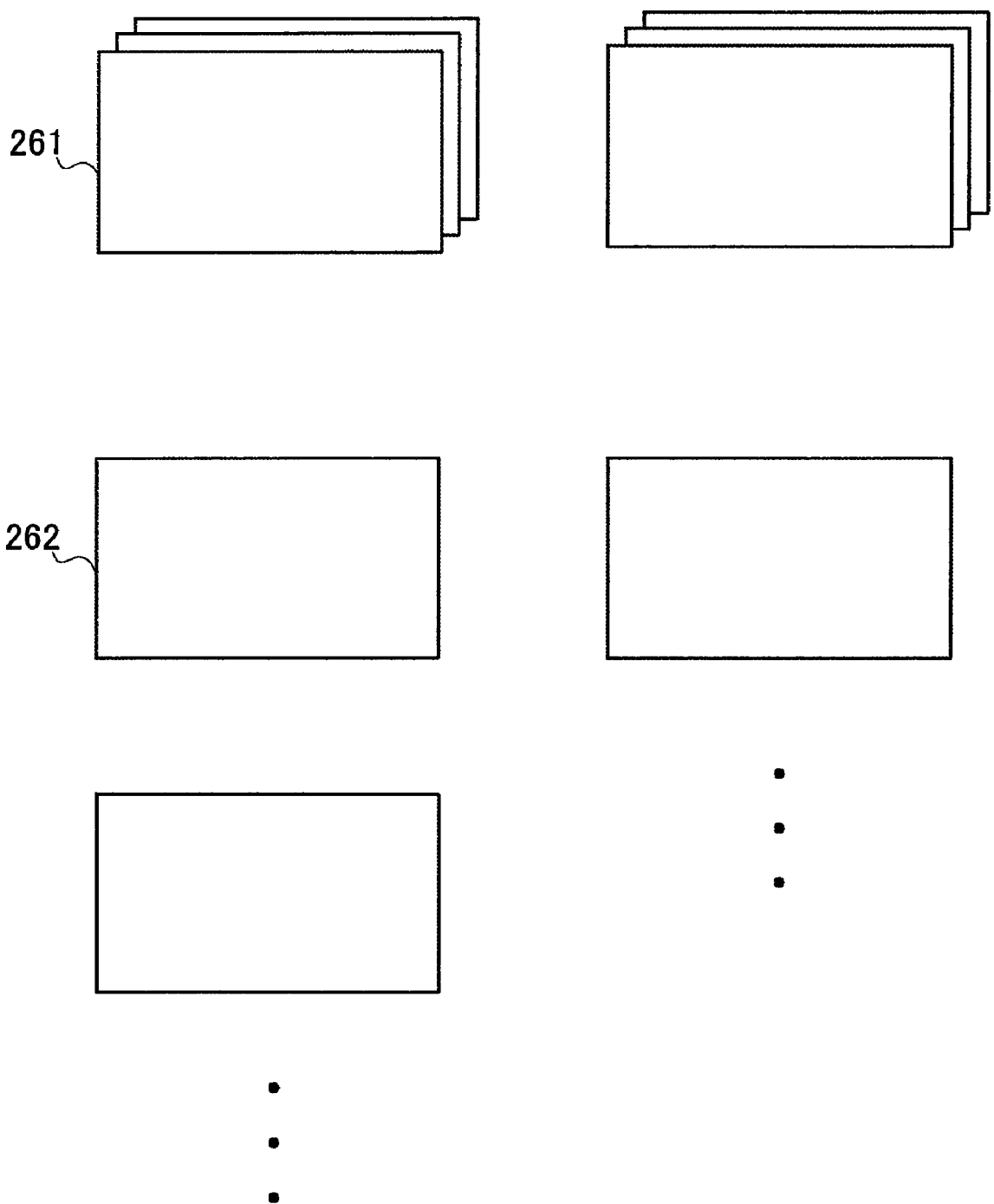
FIG. 21 is a drawing showing a sample display indicating a continuous-shot image file according to Embodiment 1 of the present invention.

FIG. 21 is a drawing showing a sample display indicating a continuous-shot image file. In this case, as one example, a continuous-shot image file is shown in display 261 and a single-shot image file is shown in display 262. A continuous-shot image file displays a main image thumbnail, and a single-shot image file displays a sub-image thumbnail. In the case of a single-shot image file, there is a single thumbnail frame, while in the case of a continuous-shot image file, there are three partially overlapping thumbnail frames. By this means, a continuous-shot image file and single-shot image file can be displayed in differentiated fashion even though they are both JPEG files. Provision may also be made for continuous-shot image file display to differ according to the number of sub-images. For example, more overlapping thumbnail frames may be displayed the greater the number of sub-images.

Thus, in a digital camera supporting a continuous-shot image file format of the present invention, or a PC in which supporting software is installed, N continuous-shot images can be handled as one image file. Even with a conventional digital camera or a PC in which supporting software is not installed, this image file can be recognized as if it were a main image single-shot image file since information other than main image information is ignored. Thus, by recording a continuous-shot image file in memory card 220 in the above-described format, compatibility with an old format is maintained, and image file handling is greatly simplified compared with the prior art.

A continuous-shot image file creation process will now be described with reference to FIG. 7 through FIG. 9.

Figure 7:
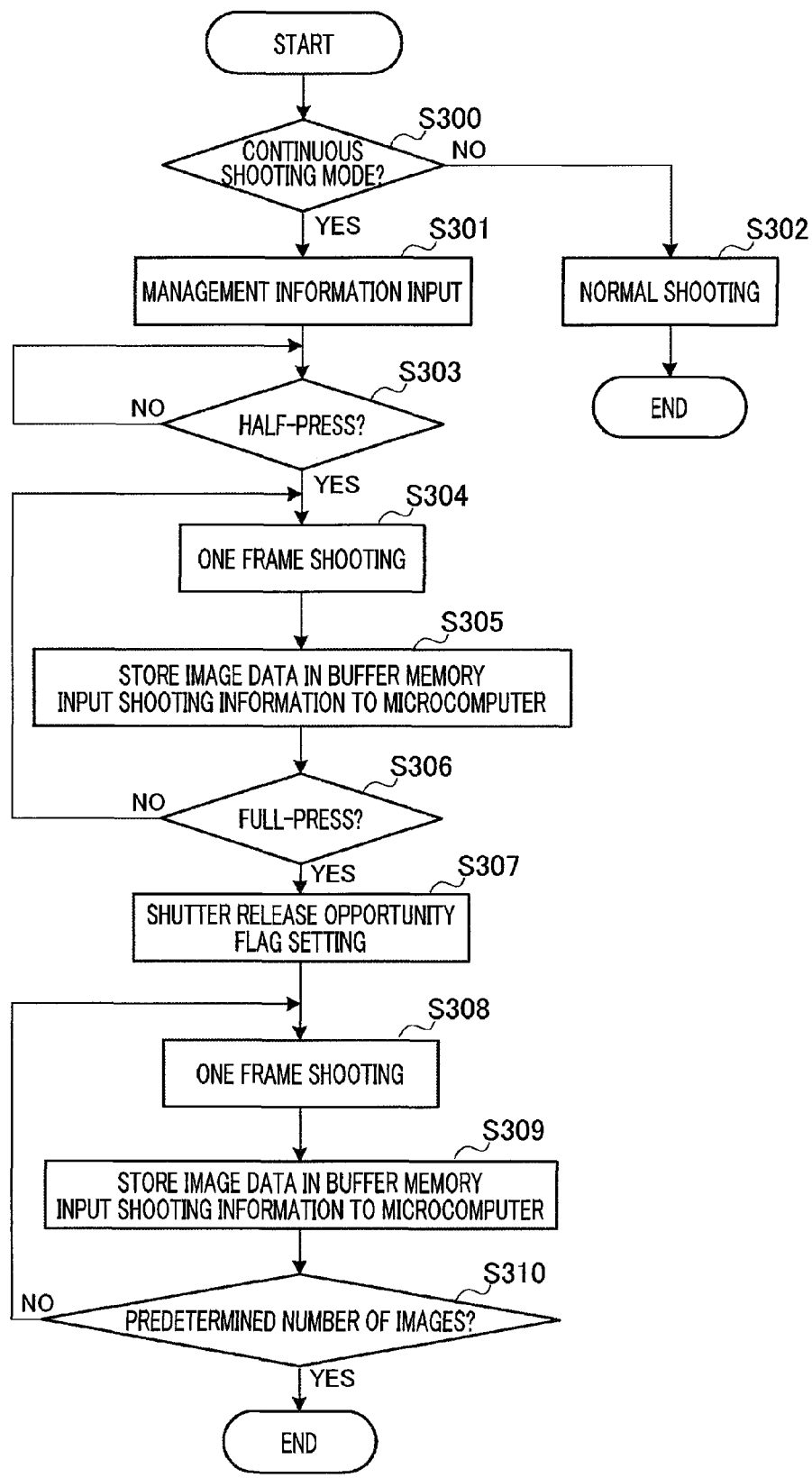
FIG. 7 is a flowchart showing a shooting operation of continuous shooting according to Embodiment 1 of the present invention.
Figure 8:
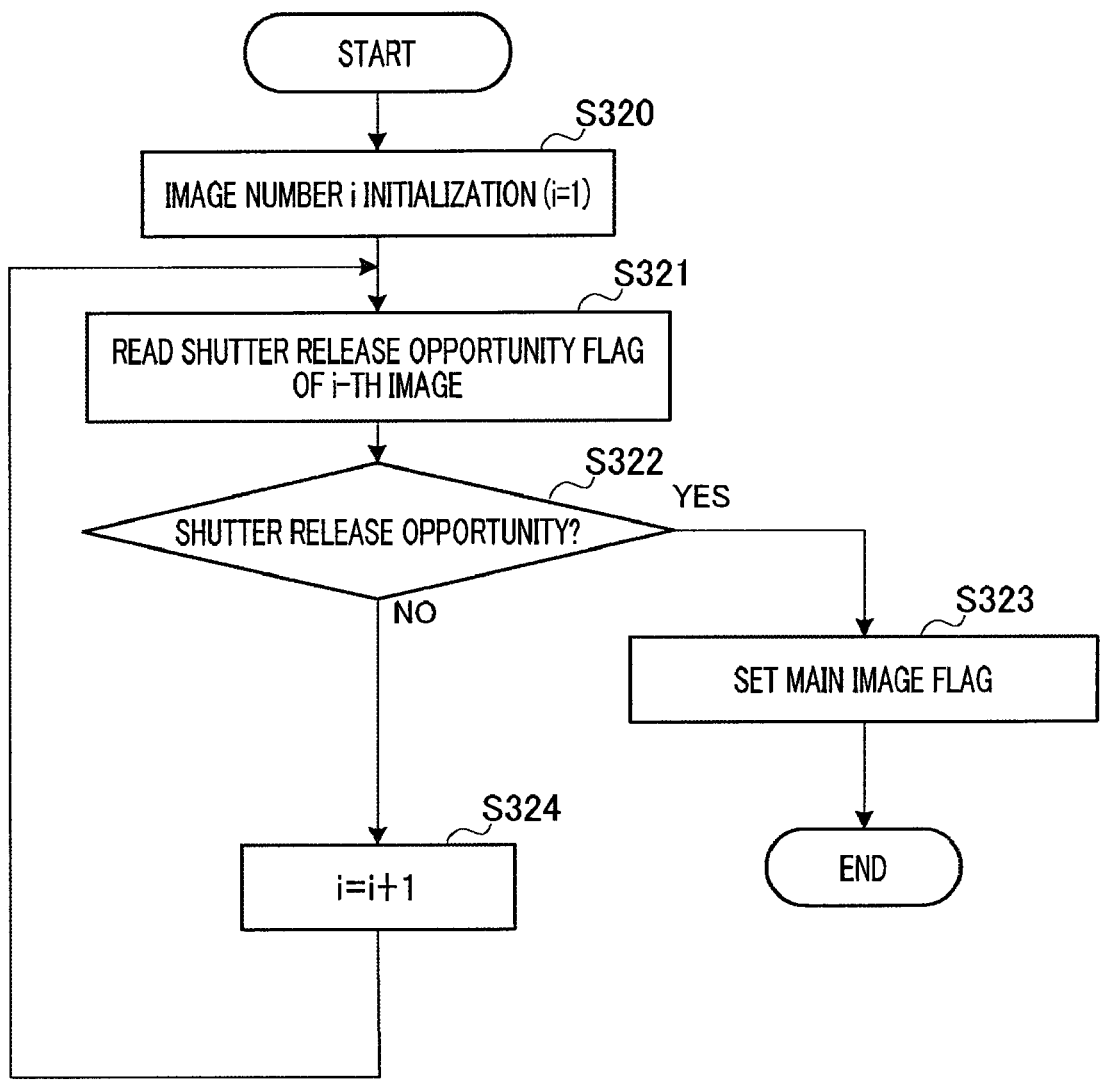
FIG. 8 is a flowchart for explaining processing that takes a shutter release opportunity image as a main image according to Embodiment 1 of the present invention.

FIG. 7 is a flowchart showing a shooting operation of continuous shooting according to Embodiment 1 of the present invention. First, in step S300, it is determined whether or not the set shooting mode is continuous shooting mode. If continuous shooting mode has not been selected ("NO"), the processing flow proceeds to step S302, and normal shooting is performed. If it is determined in step S300 that continuous shooting mode has been selected ("YES"), first, in step S301, continuous shooting management information such as the number of continuous-shot images, continuous shooting interval, shooting date and time, and shooting location is input to microcomputer 228. Then, in step S303, the system waits for release button 103 to be half-pressed. When release button 103 is half-pressed, continuous shooting is started. In step S304, first, one frame is shot, and then in step S305 captured-image image data is temporarily stored in buffer memory 215, and shooting information for that captured image is input to microcomputer 228. Next, in step S306, whether or not release button 103 is full-pressed is monitored, and continuous shooting is repeated at a predetermined time interval until release button 103 is full-pressed. Then, when full-press of release button 103 is detected in step S306 ("YES"), in step S307 a shutter release opportunity flag in shooting information for the next frame to be shot is set. Following this, in step S308 and step S309, one-frame shooting, image data storage in buffer memory 215, and shooting information input to microcomputer 228 are executed, and in step S310 it is determined whether or not the number of captured images has reached the predetermined number input in step S301, and shooting is repeated until the predetermined number is reached, and is then terminated.

A main image selection method in continuous shooting mode will now be explained with reference to FIG. 8.

In this embodiment, an image captured at the time of a shutter release opportunity is selected as a main image. FIG. 8 is a flowchart for explaining processing that takes a shutter release opportunity image as a main image according to Embodiment 1 of the present invention. When shooting ends, first, in step S320, image number is initialized (i=1). Next, in step S321, the shutter release opportunity flag of the i-th image is read from shooting information storage section 227 in microcomputer 228. Then, in step S322, it is determined whether or not this captured image is a shutter release opportunity image, and if it is a shutter release opportunity image ("YES"), in step S323 the main image flag in the shooting information is set, and processing is terminated. If it is determined in step S322 that the captured image is not a shutter release opportunity image ("NO"), in step S324 image number i is updated, the processing flow returns to step S321, and this cycle is repeated.

The continuous-shot image file creation process will now be described.

Figure 9:
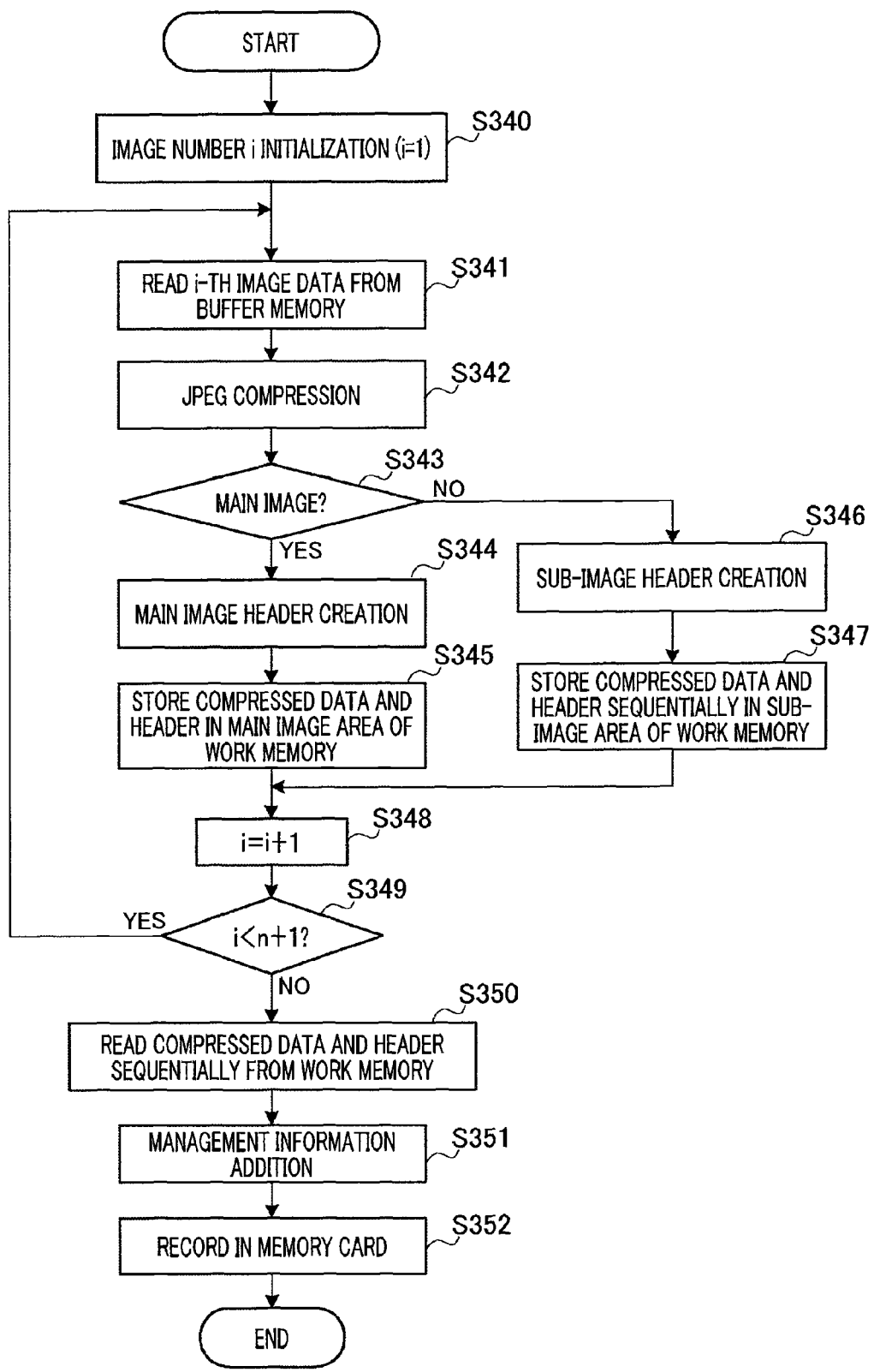
FIG. 9 is a flowchart for explaining continuous-shot image processing from conversion to file format until recording in a memory card according to Embodiment 1 of the present invention.

FIG. 9 is a flowchart for explaining continuous-shot image processing from conversion to file format until recording in memory card 220 after continuous-shooting has been performed according to Embodiment 1 of the present invention. First, in step S340, image number i is initialized. Then, in step S341, i-th image data is read from buffer memory 215, and in step S342 JPEG compression is executed. Next, in step S343, the main image flag in shooting information stored in microcomputer 228 is referenced and it is determined whether or not this image is a main image, and if it is determined that this image is a main image ("YES"), in step S344 a main image header shown in FIG. 5 is created, and in step S345 that main image header is stored in a main image area of work memory 217 together with JPEG compressed data. On the other hand, if it is determined in step S343 that the image is not a main image ("NO"), the image is determined to be a sub-image, and in step S346 a sub-image header shown in FIG. 5 is created, and in step S347 that sub-image header is stored in a sub-image area together with JPEG compressed data. Then, in step S348 and step S349, image number i updating and determination are performed, and the operations in step S341 through step S349 are repeated until the N-th image. Next, in step S350, compressed data of all images in the order "main image, sub-images 1 through N−1" and their respective headers are read sequentially from work memory 217, and in step S351 management information is added thereto. In this way, a continuous-shot image file shown in FIG. 5 is created, and finally, in step S352, is recorded in memory card 220.

Continuous-shot image file processing will now be described with reference to FIG. 10 through FIG. 14.

Figure 10:
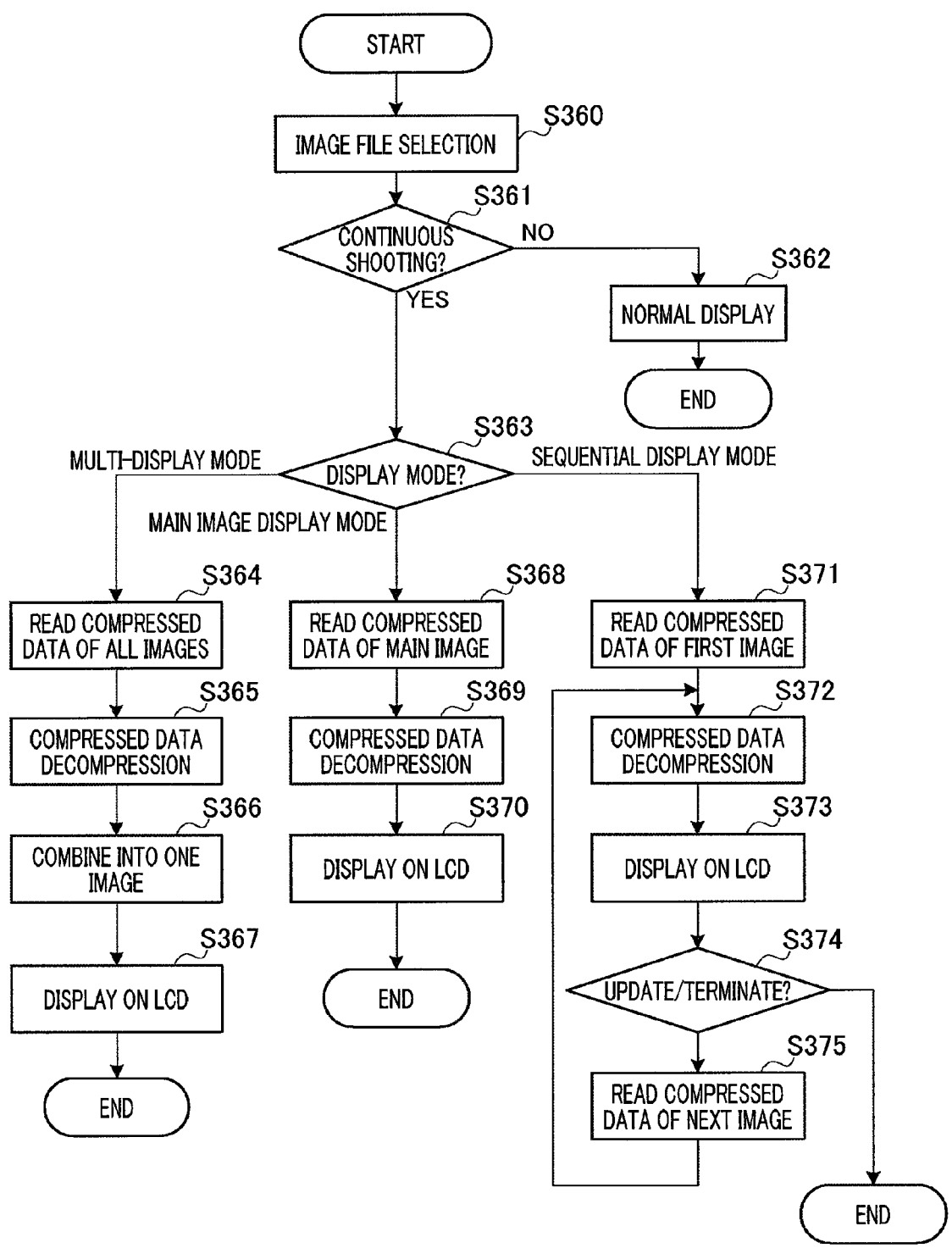
FIG. 10 is a flowchart for explaining continuous-shot image file display (print) processing according to Embodiment 1 of the present invention.
Figure 13:
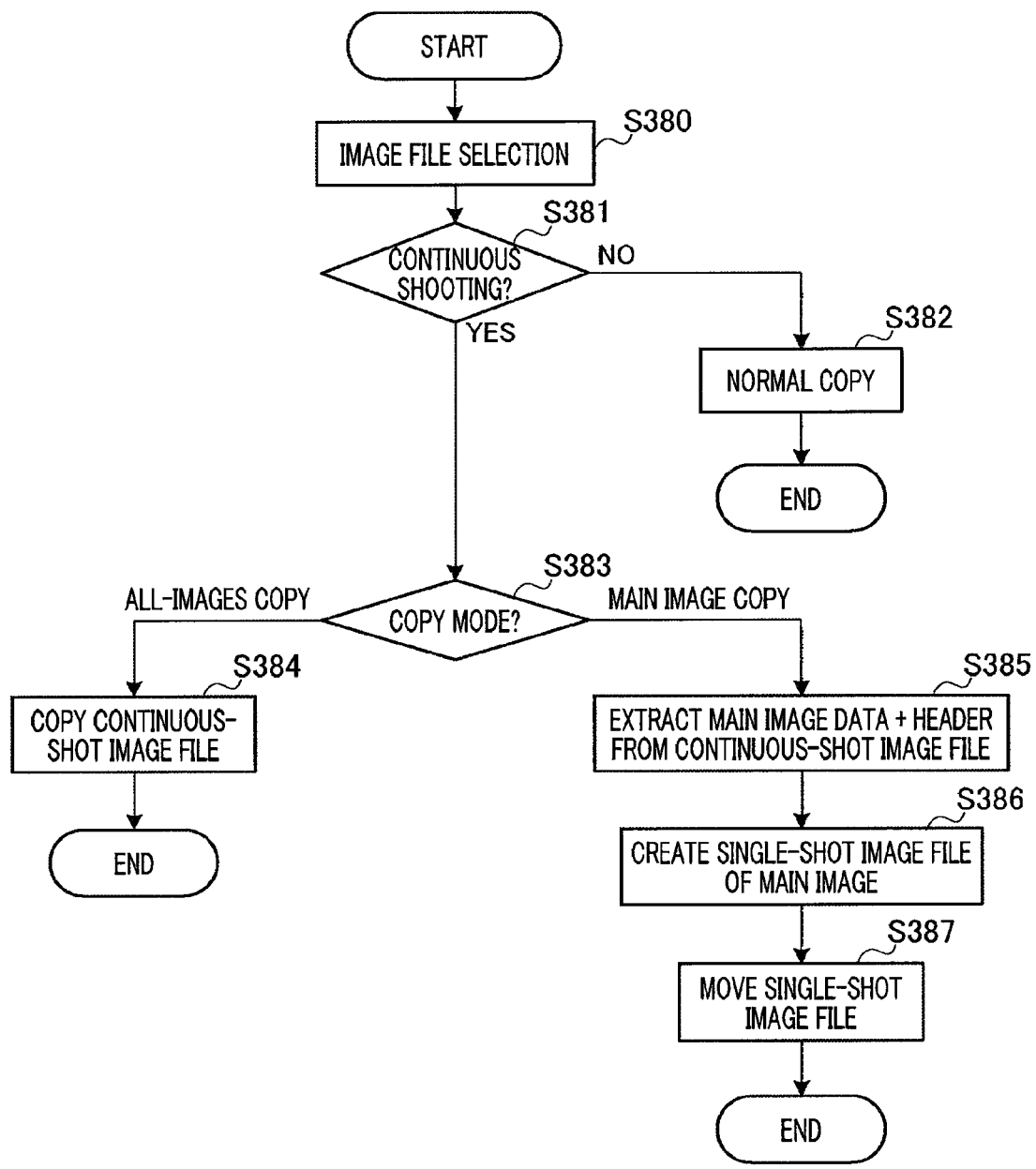
FIG. 13 is a flowchart for explaining copy (move, transmit) processing according to Embodiment 1 of the present invention.
Figure 14:
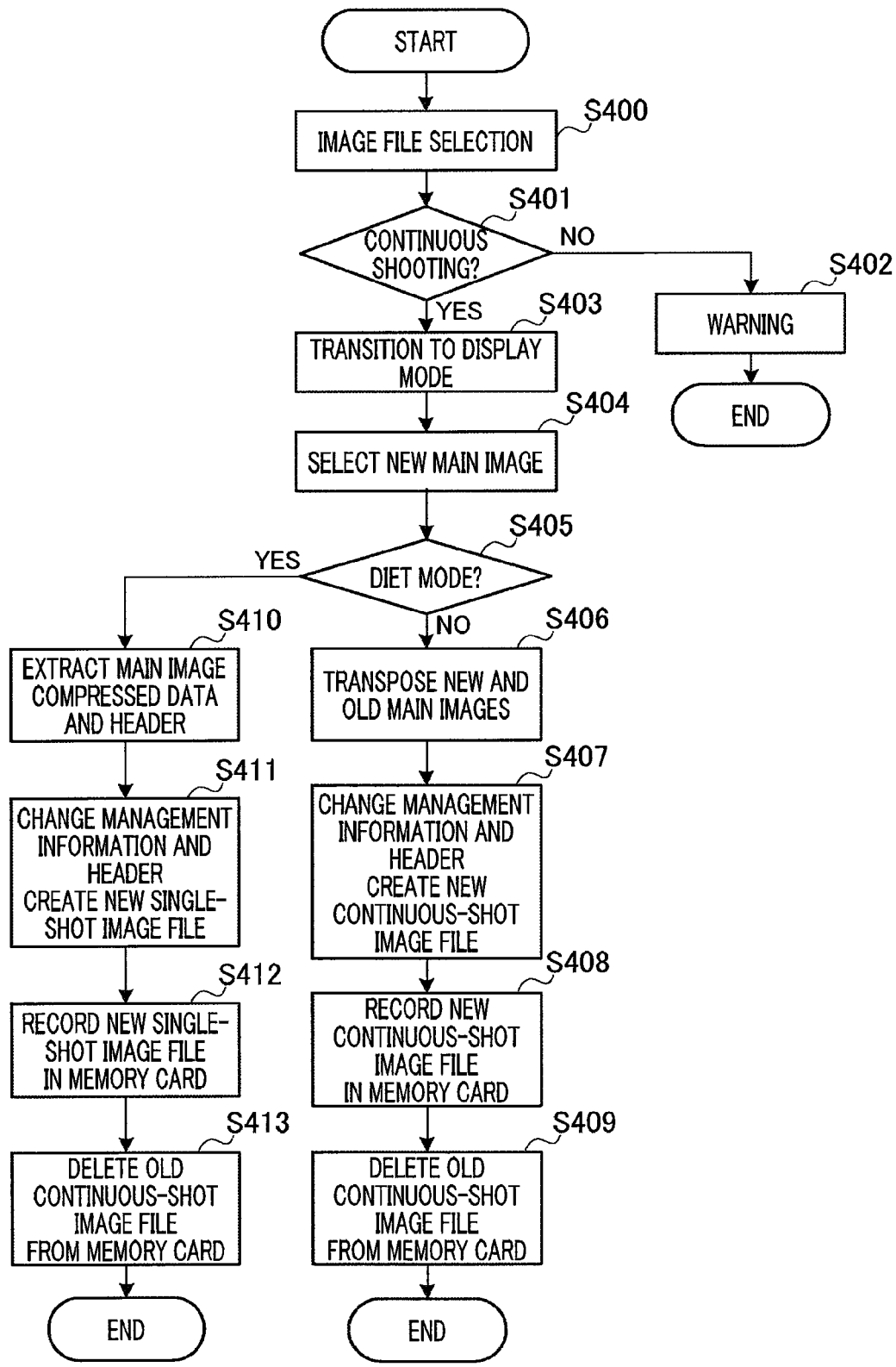
FIG. 14 is a flowchart for explaining main image replacement processing according to Embodiment 1 of the present invention.

FIG. 10, FIG. 13, and FIG. 14 are flowcharts for explaining continuous-shot image file display (print), copy (move, transmit), and main image replacement processing respectively according to Embodiment 1 of the present invention.

First, display (print) processing will be described with reference to FIG. 10.

In FIG. 10, first, in step S360, a predetermined image file is selected from a folder in memory card 220, and then in step S361 it is determined whether or not this image file is a continuous-shot image file or a single-shot image file, and if it is not a continuous-shot image file ("NO") the processing flow proceeds to step S362 and normal display is performed. On the other hand, if it is determined in step S361 that the image file is a continuous-shot image file ("YES"), in step S363 a display mode is selected. Digital camera 100 of this embodiment has three kinds of display mode: multi-display mode, main image display mode, and sequential display mode. In multi-display mode, all continuous-shot images are displayed combined into one image, allowing all continuous-shot images to be viewed at the same time, and thus offering the benefit of enabling images to be compared easily. If this multi-display mode is selected in step S363, in step S364 compressed data of all images are temporarily read into a corresponding area of work memory 217 from memory card 220, and in step S365 these compressed data are decompressed and restored to the original uncompressed image data. Then, in step S366, they are combined into one image, and in step S367 are displayed on LCD 222. An example of a screen in this multi-display mode is shown in FIG. 11. FIG. 11 shows continuous-shot image file ABCD0002.jpg in directory "100ABCDE" in FIG. 6, and illustrates a case in which seven continuous-shot images are contained in continuous-shot image file ABCD0002.jpg. In the above description, an example has been presented in which all continuous-shot images are displayed in one screen, but if there are a large number of continuous-shot images and one screen is too small, display may be performed divided into any number of screens.

If main image display mode is selected in step S363, in step S368 main image compressed data only is temporarily read into work memory 217 from a continuous-shot image file in memory card 220. The main image compressed data is decompressed in step S369, and one main image is displayed on LCD 222 in step S370. By using this main image display mode, a main image is displayed simply by selecting a continuous-shot image file without having to laboriously select one main image from among many continuous-shot images, it is possible for display to be performed in exactly the same way as for a conventional single-shot image, and file selection efficiency is greatly improved.

Figure 12:
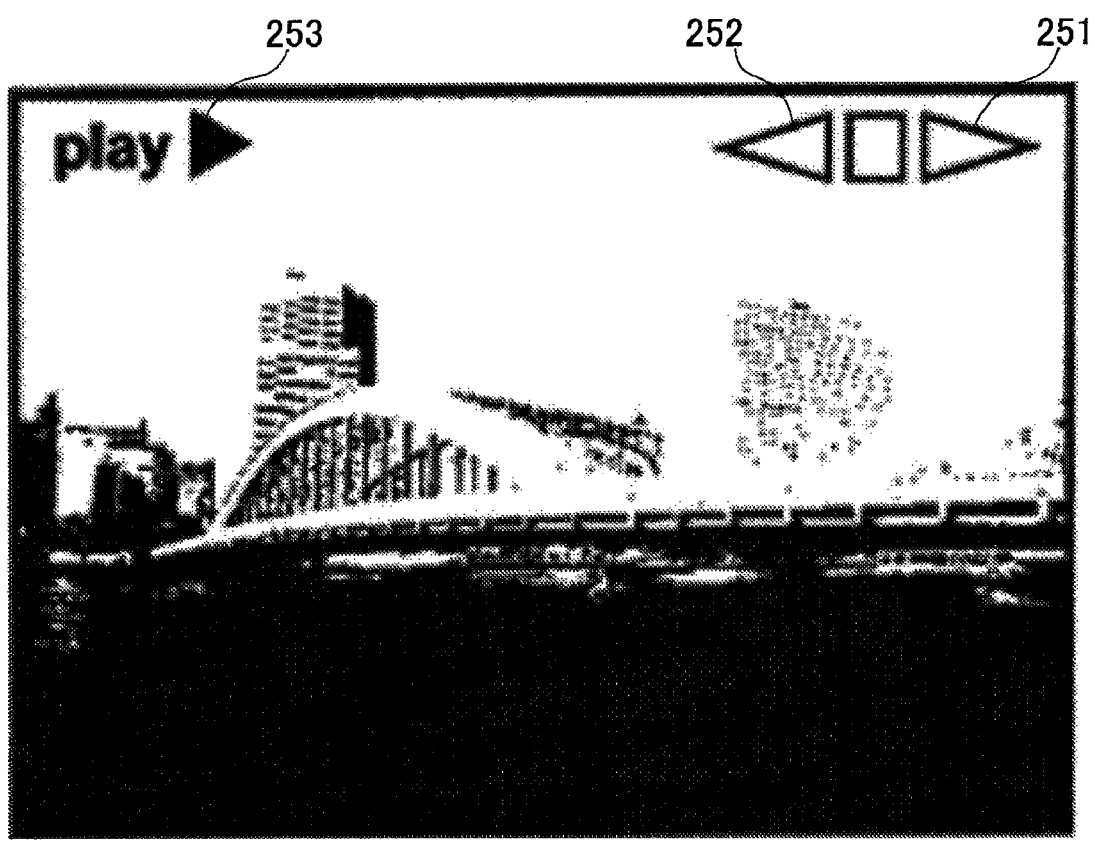
FIG. 12 is a drawing showing a sample sequential display mode screen according to Embodiment 1 of the present invention.

If sequential display mode is selected in step S363, in step S371 compressed data of the first image captured is read from memory card 220, compressed data is decompressed in step S372, and then displayed on LCD 222 in step S373. Next, in step S374, the system waits for an instruction from the photographer as to whether the displayed image is to be updated or display is to be terminated, and if there is an update instruction ("YES"), compressed data of the next image is read in step S375, and the processing flow returns to step S372. An example of a screen in this sequential display mode is shown in FIG. 12. In FIG. 12, recorded images can be displayed one at a time in shooting order or the reverse order by clicking forward key 251 or reverse key 252 respectively at the top-right of the screen. If this sequential display mode is used, the photographer does not have to select one continuous-shot image at a time, but can check all continuous-shot images one by one simply by clicking forward key 251 or reverse key 252, and can easily retrieve a desired image by rapidly switching between forward key 251 and reverse key 252. Furthermore, since only one selected image is displayed on LCD 222, more detailed checking is possible than in multi-display mode.

In the above description, a method has been described whereby images are read from memory card 220 one at a time each time an image is selected, but provision may also be made for all images to be stored temporarily in buffer memory 215, and for a selected image to be read from buffer memory 215 each time an image is selected, in the same way as in multi-display mode. This enables the time between selection and display to be shortened. Also, provision may be made for the image that is displayed first to be taken as a main image, and for images captured before and after to be displayed sequentially, centered on the main image, by means of key 251 and 252 operations. In addition, sequential playback mode has a continuous playback function, enabling all continuous-shot images to be displayed in animation mode at a fixed interval in shooting order by clicking play key 253 at the top-left of the screen.

Continuous-shot image file copy (move, transmit) processing will now be described with reference to FIG. 13.

FIG. 13 is a flowchart for explaining copy processing. In FIG. 13, first, in step S380, a predetermined image file is selected, and then in step S381 it is determined whether or not this image file is a continuous-shot image file or a single-shot image file, and if it is not a continuous-shot image file ("NO"), normal copying is performed in step S382. On the other hand, if it is determined in step S381 that the image file is a continuous-shot image file ("YES"), a copy mode is selected in step S383. There are two continuous-shot image copy modes: all-images copy mode and main image copy mode. If all-images copy mode is selected in step S383, in step S384 the continuous-shot image file is copied directly to another folder in memory card 220 and to PC 229. On the other hand, if main image copy mode is selected in step S383, in step S385 main image data and main image header information are extracted from the continuous-shot image file and a single-shot image file of the main image only is created (step S386), and in step S387 this main image single-shot image file is moved to a copy-object folder. Copying a light file of a main image only using this main image copy mode makes it possible to cut down on memory. Also, using this mode for transmission enables only a necessary image to be sent to a receiving party without imposing a load on a communication channel. Furthermore, memory capacity is not wasted on the receiving side.

Main image replacement processing will now be described with reference to FIG. 14.

FIG. 14 is a flowchart for explaining main image replacement processing. In FIG. 14, first, in step S400 a predetermined image file is selected, and then in step S401 it is determined whether or not this image file is a continuous-shot image file or a single-shot image file, and if it is not a continuous-shot image file ("NO"), a warning indicating that the selected image file is not a continuous-shot image file is displayed in step S402, and processing is terminated. On the other hand, if it is determined in step S401 that the image file is a continuous-shot image file ("YES"), in step S403 a transition is made to multi-display mode or sequential display mode, and a new main image is selected using this display mode (step S404). For example, in the step S403 display mode, display is performed from the current main image. Next, in step S405, diet mode determination is performed. Diet mode is a mode provided in order to cut down on recording capacity, and if diet mode is selected in step S405 ("YES"), in step S410 the main image compressed data and header are extracted from the continuous-shot image file, in step S411 the management information and header are changed and a new single-shot image file is created, and in step S412 this single-shot image file is recorded in memory card 220. Then, lastly, the old continuous-shot image file is deleted from memory card 220 in step S413, and processing is terminated.

If diet mode is not selected in step S405 ("NO") in step S406 new and old main images in the continuous-shot image file are transposed. This is executed by reading the continuous-shot image compressed data and header temporarily into work memory 217, storing the main image data and header in a sub-image area, storing image data and a header of a new main image in the main image area, and then reading these sequentially. Next, in step S407, the continuous-shot image file management information and header are changed, and a new continuous-shot image file is created. Then, the new continuous-shot image file is recorded in memory card 220 in step S408, and lastly, the old continuous-shot image file is deleted from memory card 220 in step S409, and processing is terminated. Thus, using this main image replacement mode enables a main image to be easily replaced with another sub-image. Also, when the remaining capacity of memory card 220 is low, image data of other than the main image can be deleted immediately using diet mode, enabling the usable capacity to be increased.

In addition to the display (print), copy (move, transmit), and main image replacement processing described here, image file processing also includes deletion, color processing, and so forth, but these kinds of processing are executed on all images contained in a continuous-shot image file. Image file processing is not limited to these kinds, and it is possible to decide as appropriate for each kind of image file processing whether that processing is to be applied only to a main image or to all images.

As described in detail above, according to this embodiment, microcomputer 228 selects one item of image data from a plurality of image data obtained by continuously capturing a plurality of images by means of a continuous shooting function as a main image, records the selected main image at the start of one image file, and also records image data of other than the main image as sub-images after the main image of that image file. Also, when main image replacement is performed, microcomputer 228 records a post-replacement main image at the start of that image file, and records image data of other than the main image after the main image of that image file. By this means, continuous-shot images are recorded together in one file, simplifying handling of related images. In this case, of the image data recorded together in one file, a main image is recorded at the start, and other sub-images are recorded sequentially after the main image, enabling a main image to be displayed accurately and rapidly in any case. In particular, locating a main image first in one file enables compatibility to be maintained with an imaging apparatus and recording media having a conventional Exif format, and ensures that display and suchlike output of a main image is possible with any kind of imaging apparatus. This offers the significant advantage of enabling playback on an old-format playback apparatus. Furthermore, locating a main image at the start also has an effect of achieving fast retrieval. As for the method of use, a main image is always output first when the relevant file is clicked.

In Patent Document 4 through Patent Document 6, methods are disclosed whereby main image data and sub-image data whose data size has been minified are recorded in one file. However, these technologies, although similar in using the terms "main image data" and "sub-image data", differ from this embodiment in (1) having simplification of retrieval as an object and (2) not being continuous-shooting technologies.

Also, in a movie mode of a digital camera, motion JPEG is provided, and a review file of a series of still images is played back in a time series. Here, a plurality of image data are recorded in one file. However, since this technology is a moving image playback technology, it differs from a technology such as this embodiment whereby a main image is placed first in a file irrespective of the shooting order.

(Embodiment 2)

Embodiment 2 is a case in which a main image is selected according to an amount of shake.

Figure 15:
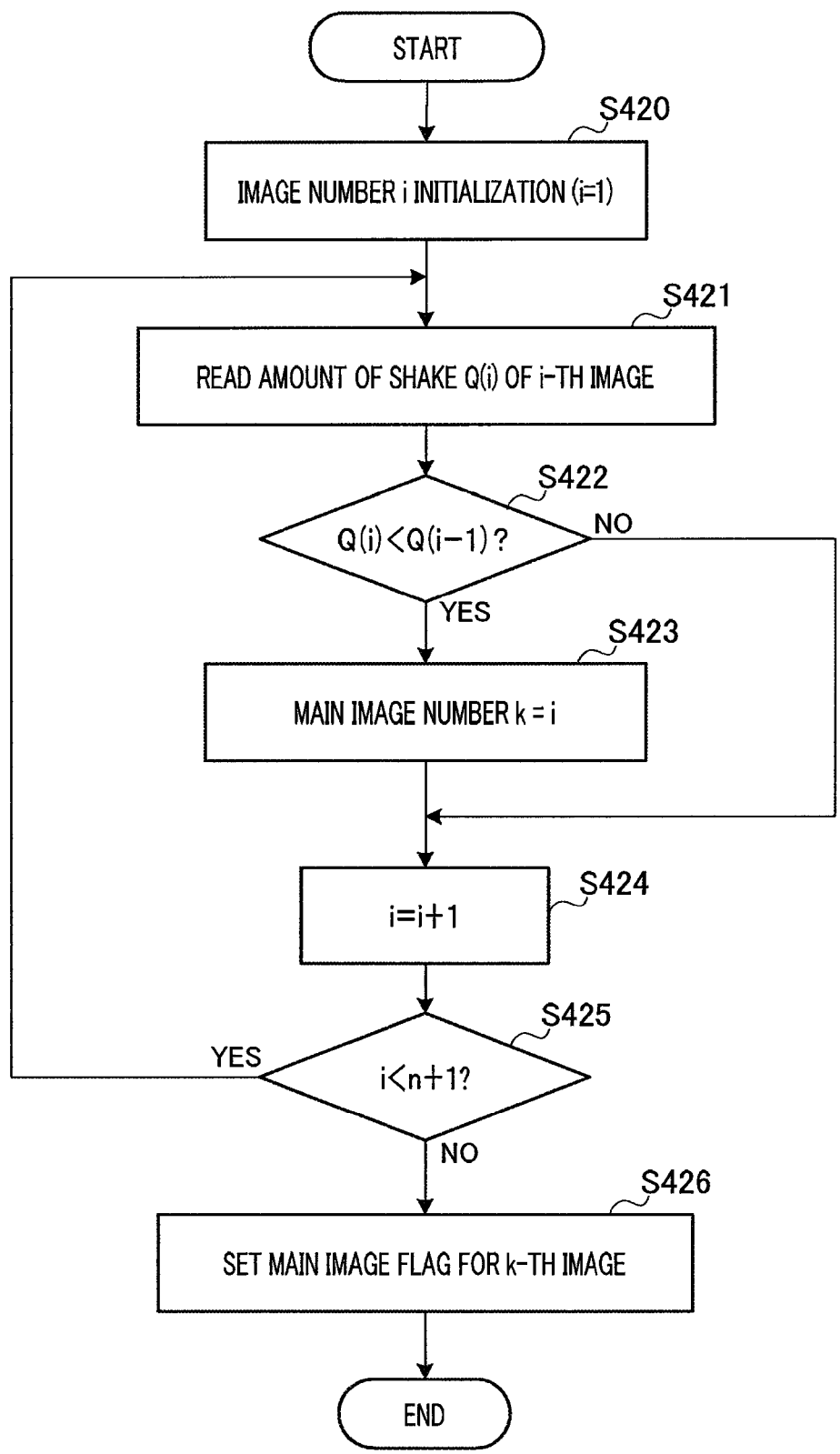
FIG. 15 is a flowchart for explaining processing that decides a main image based on a detected amount of shake according to Embodiment 2 of the present invention.

FIG. 15 is a flowchart for explaining processing that decides a main image based on a detected amount of shake according to Embodiment 2 of the present invention.

If shake occurs at shooting timing, the captured image will be blurred. Thus, in this embodiment, an amount of shake output from shake detection section 225 is monitored, and an image for which the amount of shake is smallest is selected as a main image.

In FIG. 15, first, image number i is initialized (i=1) in step S420. Then, in step S421, digital camera 100 amount of shake Q(i) stored in shooting information storage section 227 at the time of continuous shooting is read. Next, in step S422, amount of shake Q(i) is compared with amount of shake Q(i−1) of image (i−1) captured one image earlier, and if amount of shake Q(i) is smaller ("YES"), main image number k is set to i in step S423. On the other hand, if Q(i) is larger than Q(i−1), the processing flow proceeds directly to step S424, image number i is updated, and the loop from step S421 through step S425 is repeated until image number i is equal to N in step S425. Then, lastly, the main image flag is set for the k-th image in step S426, and processing is terminated. In this way, the image with the smallest amount of shake among N images captured by means of continuous shooting can be set as a main image.

(Embodiment 3)

Embodiment 3 is a case in which a main image is selected according to an amount of motion of an image.

Figure 16:
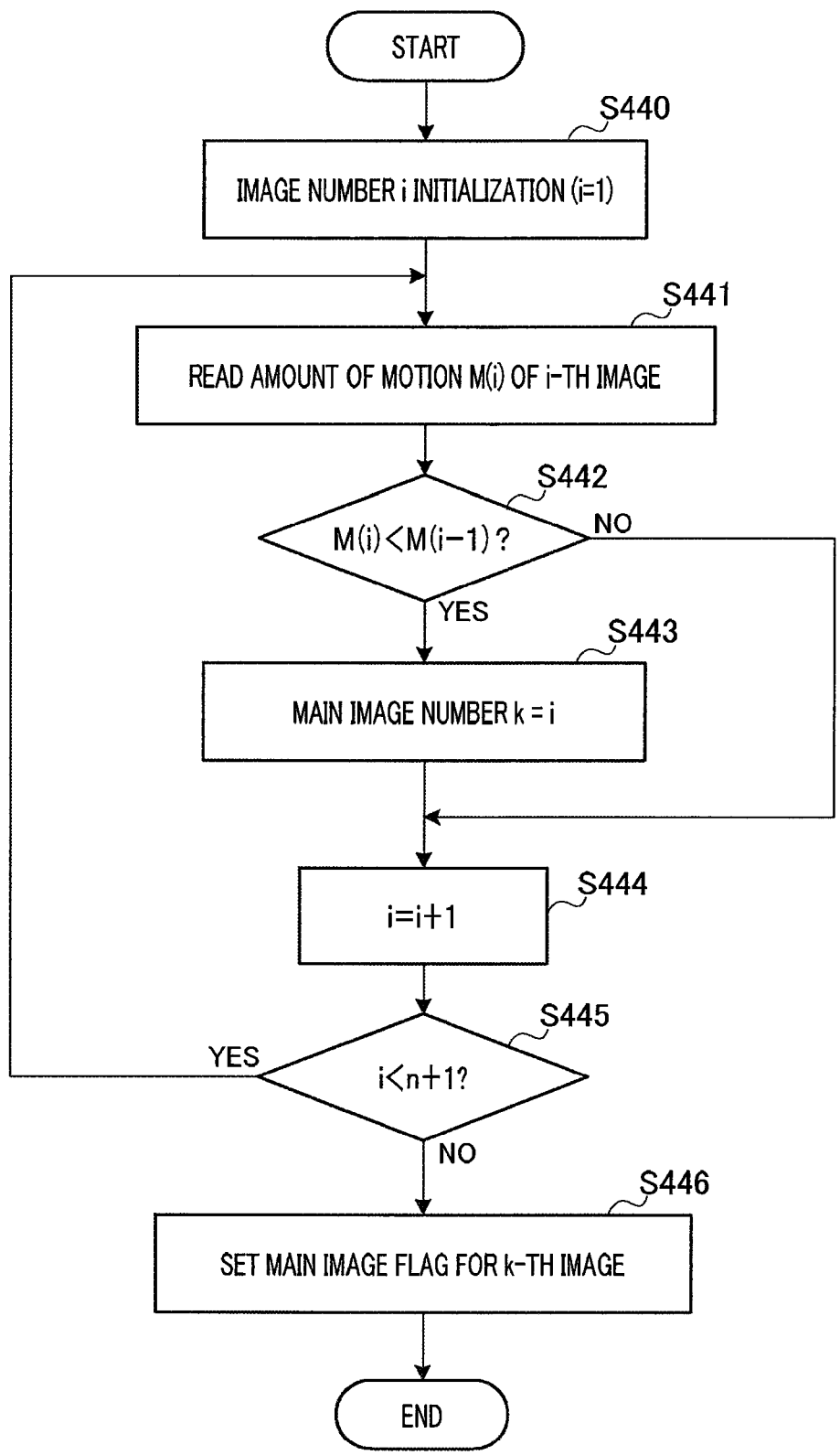
FIG. 16 is a flowchart for explaining processing that decides a main image based on an amount of motion of a captured image according to Embodiment 3 of the present invention.

FIG. 16 is a flowchart for explaining processing that decides a main image based on an amount of motion of a captured image according to Embodiment 3 of the present invention.

If a subject moves at shooting timing, the captured image will be blurred. Thus, in this embodiment, an amount of motion of a subject is monitored by means of motion detection section 214 output at the time of shooting, and an image for which the amount of motion is smallest is selected as a main image.

In FIG. 16, first, image number i is initialized (i=1) in step S440. Then, in step S441, amount of motion M(i) stored in shooting information storage section 227 at the time of continuous shooting is read. Next, in step S442, amount of motion M(i) is compared with amount of motion M(i−1) of image (i−1) captured one image earlier, and if amount of motion M(i) is smaller ("YES"), main image number k is set to i in step S443. On the other hand, if M(i) is larger than M(i−1) ("NO"), the processing flow proceeds directly to step S444, image number i is updated, and the loop from step S441 through step S445 is repeated until image number i is equal to N in step S445. Then, lastly, the main image flag is set for the k-th image in step S446, and processing is terminated. In this way, the image with the smallest amount of motion of a subject among N images captured by means of continuous shooting can be set as a main image.

(Embodiment 4)

Embodiment 4 is a case in which a main image is selected according to a degree of focusing.

Figure 17:
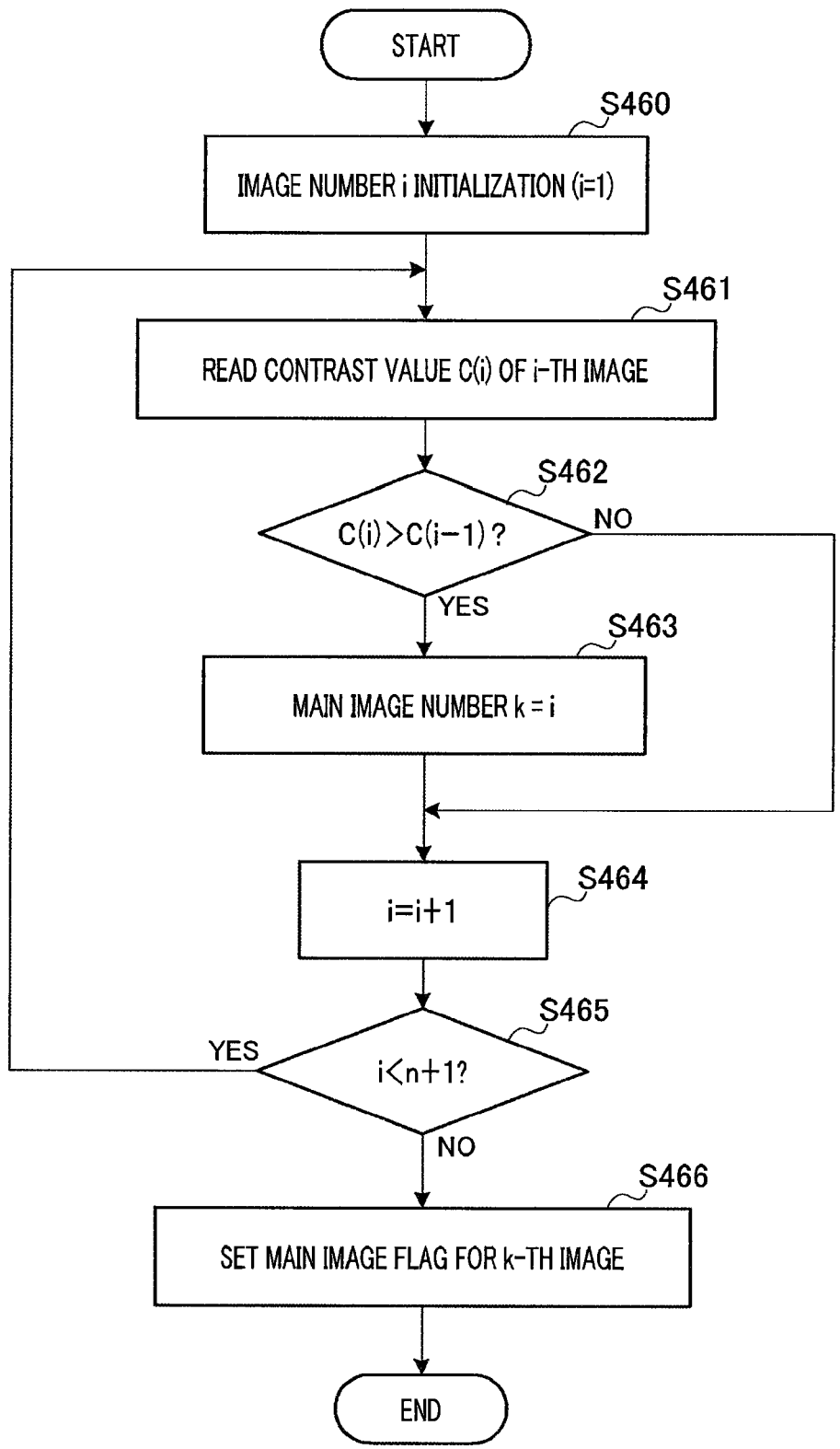
FIG. 17 is a flow chart for explaining processing that decides a main image based on a degree of focusing of a captured image according to Embodiment 4 of the present invention.

FIG. 17 is a flowchart for explaining processing that decides a main image based on a degree of focusing of a captured image according to Embodiment 4 of the present invention.

If the focal point is not exactly on the subject at shooting timing, the captured image will be fuzzy. Thus, in this embodiment, a degree of focusing is monitored by means of a captured image contrast value output from AF detection section 213, and an image with the sharpest focus is selected as a main image.

In FIG. 17, first, image number i is initialized (i=1) in step S460. Then, in step S461, contrast value C(i) stored in shooting information storage section 227 at the time of continuous shooting is read. Next, in step S462, contrast value C (i) is compared with contrast value C(i−1) of image (i−1) captured one image earlier, and if contrast value C (i) is larger ("YES"), main image number k is set to i in step S463. On the other hand, if C(i) is smaller than C(i−1), the processing flow proceeds directly to step S464, image number i is updated, and the loop from step S461 through step S465 is repeated until image number i is equal to N in step S465. Then, lastly, the main image flag is set for the k-th image in step S466, and processing is terminated. In this way, the image with the sharpest focus among N images captured by means of continuous shooting can be determined accurately, and that image can be set as a main image.

(Embodiment 5)

Embodiment 5 is a case in which a face is recognized within an image and an NG flag is set if an image in which the eyes are closed is detected.

Figure 18:
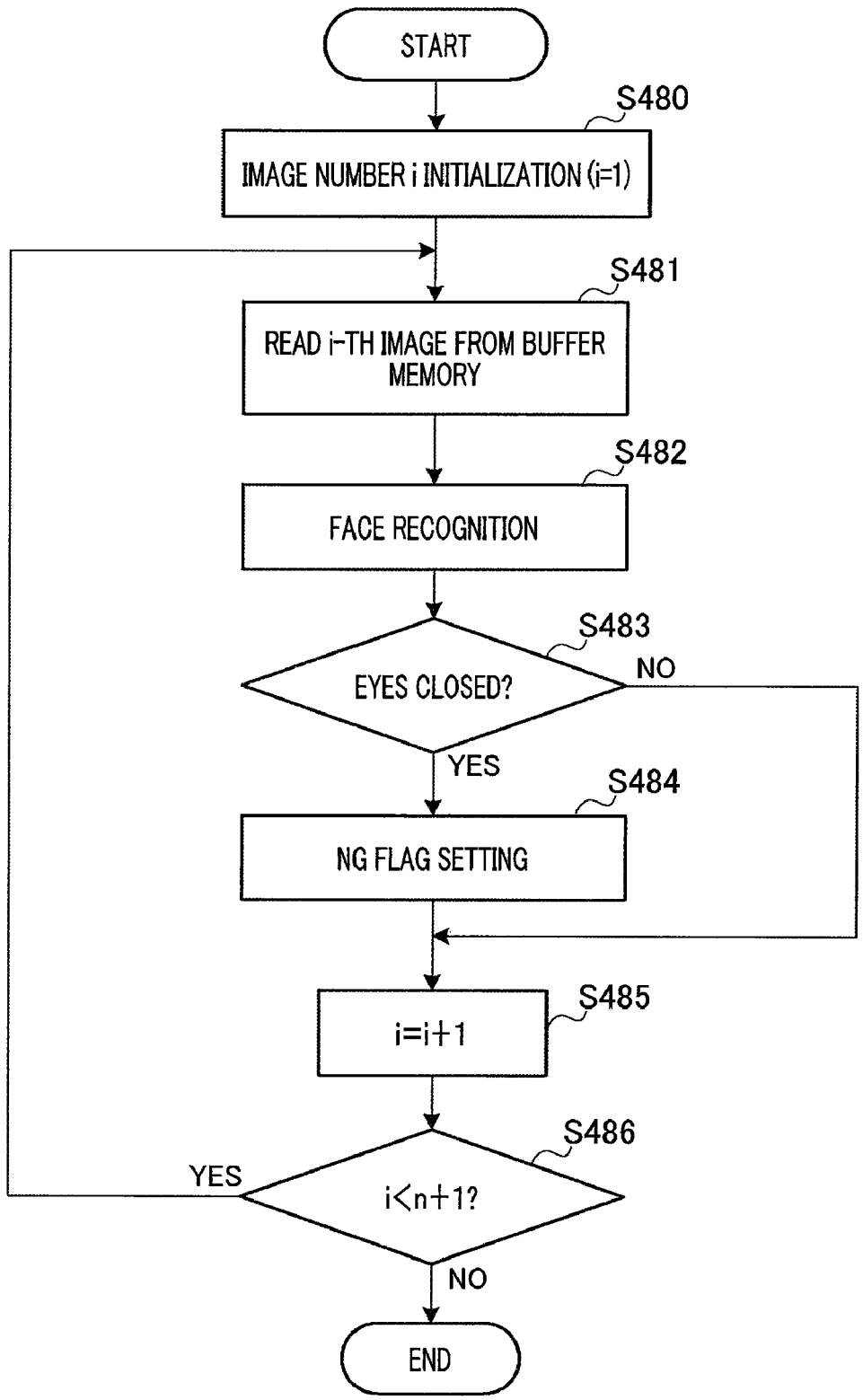
FIG. 18 is a flowchart for explaining processing that decides a main image based on a face recognition result of a captured image according to Embodiment 5 of the present invention.

FIG. 18 is a flowchart for explaining processing that decides a main image based on a face recognition result of a captured image according to Embodiment 5 of the present invention.

If the subject blinks at shooting timing, an image may be captured in which the eyes are closed. Thus, in this embodiment, provision is made for an image in which the subject's eyes are closed, based on a face recognition result from image recognition section 218, to be excluded from main image candidates. In this embodiment, it is assumed that face recognition is performed after continuous shooting has finished and N continuous-shot images have been stored in buffer memory 215.

In FIG. 18, first, image number i is initialized (i=1) in step S480. Then, in step S481, the i-th image is read from buffer memory 215. Next, in step S482, face recognition is performed. Then, in step S483, it is determined whether or not the subject's eyes are closed based on the face recognition result, and if the subject's eyes are closed ("YES"), NG is set as a face recognition result in shooting information. On the other hand, if it is determined in step S483 that the subject's eyes are not closed ("NO") the processing flow proceeds directly to step S485, image number i is updated, and the loop from step S481 through step S486 is repeated until image number i is equal to N in step S486. In this way, an NG setting can be made for an image in which the subject's eyes are closed among N images captured by means of continuous shooting, and that image can be excluded from the candidates when selecting a main image.

(Embodiment 6)

Embodiment 6 is a case in which a preferred image is set as a main image after shooting in auto-bracket mode (hereinafter referred to as "AB mode").

Figure 19:
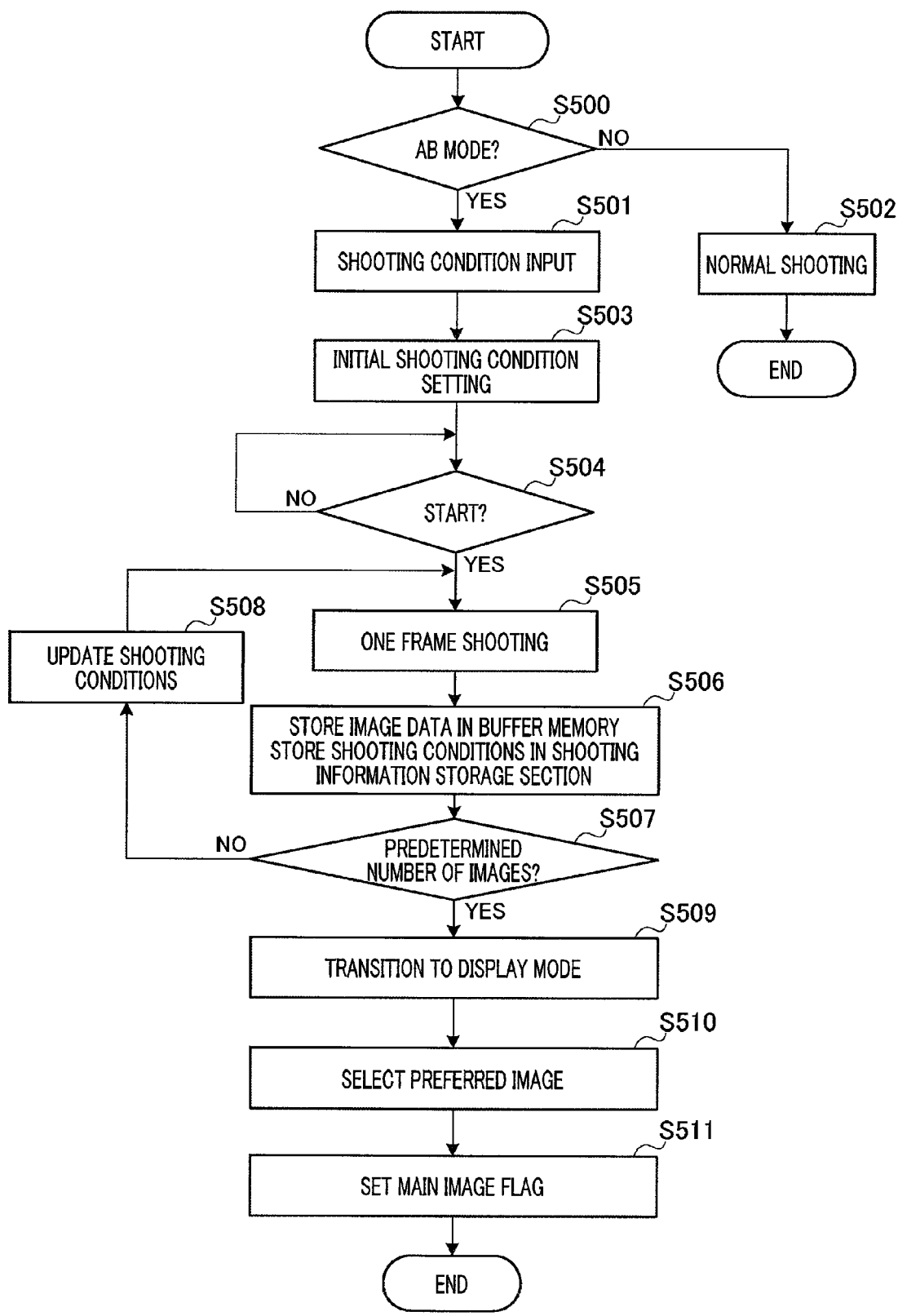
FIG. 19 is a flowchart showing a main image selection operation in AB mode shooting according to Embodiment 6 of the present invention.

FIG. 19 is a flowchart showing a main image selection operation in AB mode shooting according to Embodiment 6 of the present invention.

In FIG. 19, first, in step S500, it is determined whether or not the set shooting mode is AB mode. If the set mode is not AB mode ("NO"), normal shooting is performed in step S502. If it is determined in step S500 that AB mode has been selected ("YES"), first, in step S501, continuous shooting management information such as the number of continuous-shot images, continuous shooting interval, shooting date and time, and shooting location is input to microcomputer 228. Then, in step S503, initial values are set for the shooting conditions, and in step S504 the system waits for release button 103 to be pressed and shooting to start. When AB mode has been set, full-press of release button 103 causes a predetermined number of images to be captured while shooting conditions are changed in a preset manner. When release button 103 is pressed and shooting starts in step S504, one frame is shot in step S505, and then in step S506 captured image data is stored in buffer memory 215, and the shooting conditions at that time are stored in shooting information storage section 227. Then, in step S507, it is determined whether or not the number of captured images has reached the predetermined number, and shooting is repeated while updating the shooting conditions (step S508) until the predetermined number is reached. When shooting ends, a transition is made to display mode in step S509, and a preferred image is selected from among the images captured in AB mode (step S510). Then, lastly, the main image flag is set in the shooting information of the selected image in step S511, and processing is terminated. In this way, one continuous-shot image file having one main image is recorded in memory card 220 in AB mode shooting in the same way as in normal continuous shooting.

Precision of selection can be further improved by combining the main image selection method in normal continuous shooting described in Embodiment 1 through Embodiment 5 with this AB mode shooting main image selection method. Shooting conditions that change for each shot in AB mode shooting include the exposure amount, white balance, and so forth, but are not, of course, limited to these.

As described above, with an imaging apparatus according to an embodiment of the present invention, a main image can be selected rapidly and accurately from a plurality of continuous-shot images captured by means of continuous shooting, and handling of an image file recorded in memory card 220 is extremely easy.

The above description presents examples of preferred embodiments of the present invention, but the scope of the present invention is not limited to these.

The present invention can be applied to any kind of apparatus that is an electronic device having an imaging apparatus. For example, it is possible to apply the present invention not only to digital cameras and video cameras, but also to camera-equipped mobile phones, portable terminal apparatuses such as PDAs (Personal Digital Assistants), personal computers equipped with an imaging apparatus, and suchlike information processing apparatuses.

As long as control is performed to record a main image at the start and to record other sub-images sequentially after the main image, any kind of method can be used, and, for example, a method whereby a flag is set for a main image may be used as well as a method in which a pointer that indicates a main image is used. Furthermore, in addition to a method whereby image data rearrangement is performed at the time of main image replacement, it is also possible to use a method whereby image data rearrangement is not performed and a main image is copied to the start position.

In the above description, it has been assumed that main image selection is performed automatically in the case of normal continuous shooting, but the present invention is not limited to this, and provision may also be made for a photographer to manually set a preferred image while visually checking all images captured using multi-display mode or sequential display mode after shooting, in the same way as with AB mode shooting.

In the above description, a main image is decided by independently evaluating a shooting state, but a main image may also be decided by performing overall evaluation of a plurality of shooting states. For example, each shooting state could be given an evaluation score, and the image with the highest total score would be selected as a main image.

In the above description, cases have been described in which a captured image is recorded in a memory card after undergoing JPEG compression, but it goes without saying that an image may also be recorded using another compression method, and that the present invention can also be applied to an uncompressed image.

In the above description, processing by a digital camera has been described, but the same kind of processing is also possible for a PC or suchlike information device in which software supporting a continuous-shot image file is installed.

In the above description, cases have been described in which a continuous-shot image file is created for images captured continuously in both continuous shooting mode and AB mode, but the images need not necessarily be continuous-shot images, and it is also possible to create one continuous-shot image file by collecting together related images after they have been individually captured one by one. For example, a plurality of images captured while manually varying the zoom magnification ratio may be recorded in continuous-shot image file format.

In the above embodiments, the term "imaging apparatus" has been used, but this is simply for convenience of description, and a term such as "photographic apparatus", "digital camera", "imaging method" or the like may, of course, also be used.

The type, associated drive section, installation method, and so forth of component sections configuring an above-described digital camera—for example, the type, associated drive section, installation method, and so forth of the imaging optical system, and the type and so forth of the motion detection section—are not limited to those in the above embodiments.

An above-described imaging apparatus is also implemented by a program for causing the shooting control method of this imaging apparatus to function. This program is stored in a recording medium that can be read by a computer.

The disclosure of Japanese Patent Application No. 2007-005611, filed on Jan. 15, 2007, including the specification, drawings and abstract, is incorporated herein by reference in its entirety.

INDUSTRIAL APPLICABILITY

The present invention is suitable for use in an imaging apparatus such as a digital camera having a continuous shooting function.

The invention claimed is:

1. An imaging apparatus comprising:
    an imaging section configured to continuously capture a plurality of images and acquire a plurality of image data; and
    a control section configured to select a first image data from the plurality of image data as a main image data and record the main image data and remaining image data of the plurality of image data in one image file,
    wherein the control section is configured to read the one image file, receive a selection of a second image data from the plurality of image data as a new main image data, replace the main image data with the new main image data, and record the new main image data and remaining image data of the plurality of image data in the one image file.

2. The imaging apparatus according to claim 1, wherein the control section transposes the new main image data with the main image data in the one image file when the main image data is replaced with the new main image data.

3. The imaging apparatus according to claim 1, wherein the control section copies the new main image data to a predetermined location in the one image file when the main image data is replaced with the new main image data.

4. The imaging apparatus according to claim 1, wherein the control section selects the first image data from the plurality of image data as the main image data, records the main image data at a start of the one image file, and records image data of other than the main image data as a sub-image after the main image data of the one image file.

5. The imaging apparatus according to claim 4, wherein the control section, when replacement of the main image data is performed, records a post-replacement main image data at a start of the one image file, and records image data of other than the main image data after the main image data of the one image file.

6. The imaging apparatus according to claim 4, wherein the control section reads the one image file, receives a selection of one item of image data from the plurality of image data, records the selected image data as a new main image data at a start of the one image file, and records remaining image data after the main image data of the one image file.

7. The imaging apparatus according to claim 1, wherein the control section first plays back the main image data when playing back the plurality of image data in the one image file.

8. The imaging apparatus according to claim 1, wherein the control section plays back only the selected image data and image data preceding and following this when playing back the plurality of image data.

9. The imaging apparatus according to claim 1, wherein the control section reads the image file, receives an image data selection from the plurality of image data, and deletes the selected image data from the image file.

10. The imaging apparatus according to claim 1, wherein a header of the selected image data and a header of the remaining image data have an identical structure.

* * * * *